(12) United States Patent
Yasui

(10) Patent No.: US 11,897,464 B2
(45) Date of Patent: Feb. 13, 2024

(54) VEHICLE CONTROL METHOD, VEHICLE CONTROL DEVICE, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 18 days.

(21) Appl. No.: 17/203,776

(22) Filed: Mar. 17, 2021

(65) Prior Publication Data

US 2021/0300362 A1    Sep. 30, 2021

(30) Foreign Application Priority Data

Mar. 26, 2020   (JP) .................................. 2020-056118

(51) Int. Cl.
*B60W 30/00*       (2006.01)
*B60W 30/095*     (2012.01)
(Continued)

(52) U.S. Cl.
CPC ........ *B60W 30/0956* (2013.01); *B60W 10/04* (2013.01); *B60W 10/20* (2013.01); *B60W 50/14* (2013.01); *B60Q 9/008* (2013.01); *B60W 2552/45* (2020.02); *B60W 2554/4026* (2020.02); *B60W 2554/4029* (2020.02);
(Continued)

(58) Field of Classification Search
CPC ............ G08G 1/07; G08G 1/005; G08G 1/09; G08G 1/16; B60R 21/00
See application file for complete search history.

(56) References Cited

U.S. PATENT DOCUMENTS 11,393,339 B1 *   7/2022   Buentello .............. G08G 1/161
2017/0329332 A1 * 11/2017  Pilarski ................ G05D 1/0088
(Continued)

FOREIGN PATENT DOCUMENTS

CN    108688681    10/2018
CN    108974010    12/2018
(Continued)

OTHER PUBLICATIONS

Chinese Office Action for Chinese Patent Application No. 202110311004.1 dated Jun. 29, 2023.
(Continued)

*Primary Examiner* — Russell Frejd
*Assistant Examiner* — Brittany Renee Peko
(74) *Attorney, Agent, or Firm* — Amin, Turocy & Watson, LLP

(57) ABSTRACT

A vehicle control method includes recognizing a vicinity of a vehicle, setting a risk index for a traffic participant, and controlling a vehicle-mounted instrument of the vehicle based on the risk index which is set by the setter, and setting a risk index for a position at which the traffic participant will be present in the future based on ease of entry of the traffic participant from a sidewalk to a roadway adjacent to the sidewalk in a region that the traffic participant traveling on the sidewalk will enter in the future, and increasing a risk index to be set on the roadway side as there is a greater tendency for the traffic participant to enter the roadway.

20 Claims, 18 Drawing Sheets

(51) Int. Cl.
  *B60W 10/04* (2006.01)
  *B60W 10/20* (2006.01)
  *B60W 50/14* (2020.01)
  *B60Q 9/00* (2006.01)
(52) U.S. Cl.
  CPC .. *B60W 2554/4041* (2020.02); *B60W 2554/60* (2020.02); *B60W 2710/20* (2013.01); *B60W 2720/10* (2013.01); *B60W 2720/12* (2013.01)

(56) References Cited

U.S. PATENT DOCUMENTS

| | | | |
|---|---|---|---|
| 2018/0281819 A1 | 10/2018 | Akaba et al. | |
| 2018/0348752 A1 | 12/2018 | Sakamoto et al. | |
| 2019/0221115 A1* | 7/2019 | Masuike | G08G 1/07 |
| 2019/0278270 A1 | 9/2019 | Tsuchiya et al. | |
| 2019/0377354 A1* | 12/2019 | Shalev-Shwartz | G05D 1/0214 |
| 2020/0086860 A1 | 3/2020 | Oguro et al. | |
| 2020/0117206 A1* | 4/2020 | Egnor | G05D 1/0223 |
| 2021/0061350 A1* | 3/2021 | Kinoshita | B62D 6/001 |
| 2021/0070322 A1* | 3/2021 | Noy | B60W 60/0027 |
| 2022/0169245 A1* | 6/2022 | Hieida | B60W 30/0956 |
| 2022/0176954 A1* | 6/2022 | Kobayashi | B60W 30/0956 |

FOREIGN PATENT DOCUMENTS

| | | | | |
|---|---|---|---|---|
| CN | 110239549 | 9/2019 | | |
| CN | 110402371 | 11/2019 | | |
| CN | 110418744 | 11/2019 | | |
| EP | 3522134 | 8/2019 | | |
| JP | 2008-282097 | 11/2008 | | |
| JP | 2010102437 A | * 5/2010 | | G08G 1/16 |
| JP | 2010-165003 | 7/2010 | | |
| JP | 2013-173416 | 9/2013 | | |
| JP | 2014-006700 | 1/2014 | | |
| JP | 2018-055272 | 4/2018 | | |
| JP | 2018-205907 | 12/2018 | | |
| WO | 2018/158642 | 9/2018 | | |

OTHER PUBLICATIONS

Japanese Office Action for Japanese Patent Application No. 2020-056118 dated Sep. 5, 2023.

* cited by examiner

VEHICLE CONTROL METHOD, VEHICLE CONTROL DEVICE, AND STORAGE MEDIUM

CROSS-REFERENCE TO RELATED APPLICATION

Priority is claimed on Japanese Patent Application No. 2020-056118, filed Mar. 26, 2020, the content of which is incorporated herein by reference.

BACKGROUND

Field of the Invention

The present invention relates to a vehicle control method, a vehicle control device, and a storage medium.

Description of Related Art

Since the past, a processing device that, when there is another vehicle stopped on one side of a road in the width direction thereof and there is a pedestrian on the other side of the road in the width direction, sets a second warning region, for another vehicle, which is wider than a first warning region when there is another vehicle stopped on one side of a road in the width direction thereof but there is no pedestrian on the other side of the road in the width direction has been disclosed (Japanese Unexamined Patent Application, First Publication No. 2018-205907).

However, this device may not be able to accurately set a risk accurately according to a traffic participant's situation. In this case, a vehicle may not be appropriately controlled.

SUMMARY

The present invention was contrived in view of such circumstances, and one object thereof is to provide a vehicle control method, a vehicle control device, and a storage medium that make it possible to realize appropriate vehicle control according to a traffic participant and the environment around the traffic participant.

The following configurations are adopted in a vehicle control method, a vehicle control device, and a storage medium according to this invention.

(1) According to an aspect of this invention, there is provided a vehicle control method including recognizing a vicinity of a vehicle; setting a risk index for a recognized traffic participant; controlling a vehicle-mounted instrument of the vehicle based on the set risk index; and setting a risk index for a position at which the traffic participant will be present in the future based on ease of entry of the traffic participant from a sidewalk to a roadway adjacent to the sidewalk in a region that the traffic participant traveling on the sidewalk will enter in the future, and increasing a risk index to be set on the roadway side as there is a greater tendency for the traffic participant to enter the roadway.

(2) In the aspect of the above (1), further comprising: controlling a speed and steering of the vehicle based on the set risk index.

(3) In the aspect of the above (1) or (2), further comprising: controlling an output device to output information for making an occupant of the vehicle to stare at the traffic participant based on the set risk index.

(4) In any aspect of the above (1) to (3), the traffic participant is a bicycle.

(5) In any aspect of the above (1) to (4), further comprising: setting a risk index to be set on the roadway side when a structure of a boundary between the sidewalk and the roadway is a structure in which the traffic participant is able to enter the roadway from the sidewalk to be larger than the risk index to be set on the roadway side when the structure is a structure that makes it impossible to enter the roadway.

(6) In any aspect of the above (1) to (5), further comprising: setting the risk index in accordance with a type of structure of a boundary between the sidewalk and the roadway.

(7) In the aspect of the above (6), the structure is a type of curbstone provided at the boundary.

(8) In any aspect of the above (1) to (7), further comprising: in a case where at least the risk index is equal or greater than a threshold, offsetting at least a specific region corresponding to the risk index to be set on the roadway side to the sidewalk side.

(9) In any aspect of the above (1) to (8), further comprising: setting the risk index to be set on the roadway side when the traffic participant's face or body is directed toward the roadway side to be larger than the risk index to be set on the roadway side when the traffic participant's face or body is not directed toward the roadway side.

(10) In any aspect of the above (1) to (9), the traffic participant includes a person or a moving object that a person is on board, and the vehicle control method further comprising: setting a risk index to be set on the roadway side when a central axis of the traffic participant or the moving object tilts in a vertical direction to be larger than a risk index to be set on the roadway side when the central axis of the traffic participant or the moving object does not tilt in the vertical direction.

(11) In any aspect of the above (1) to (10), further comprising: setting the risk index to be set on the roadway side when there is an object having an influence on traveling of the traffic participant in front of a region that the traffic participant traveling on the sidewalk will enter in the future to be larger than the risk index to be set on the roadway side when there is no object having an influence on the traveling of the traffic participant.

(12) According to an aspect of this invention, there is provided a vehicle control device including: a recognizer configured to recognize a vicinity of a vehicle; a setter configured to set a risk index for a traffic participant recognized by the recognizer; and a controller configured to control a vehicle-mounted instrument of the vehicle based on the risk index which is set by the setter, wherein the setter sets a risk index for a position at which the traffic participant will be present in the future based on ease of entry of the traffic participant from a sidewalk to a roadway adjacent to the sidewalk in a region that the traffic participant traveling on the sidewalk will enter in the future, and increases a risk index to be set on the roadway side as there is a greater tendency for the traffic participant to enter the roadway.

(13) According to an aspect of this invention, there is provided a-non transitory storage readable storage medium that stores a program to be executed by a computer to at least: recognize a vicinity of a vehicle; set a risk index for a recognized traffic participant; control a vehicle-mounted instrument of the vehicle based on the set risk index; and set a risk index for a position at which the traffic participant will be present in the future based on ease of entry of the traffic participant from a sidewalk to a roadway adjacent to the sidewalk in a region that the traffic participant traveling on the sidewalk will enter in the future, and increase a risk index to be set on the roadway side as there is a greater tendency for the traffic participant to enter the roadway.

According to (1) to (13), the vehicle control method, the vehicle control device, or the storage medium sets a risk index for a position at which a traffic participant will be present in the future based on the ease of entry of the traffic participant from a sidewalk to a roadway adjacent to the sidewalk in a region that the traffic participant traveling on the sidewalk will enter in the future, and increases the risk index to be set on the roadway side as there is a greater tendency for the traffic participant to enter the roadway, so that it is possible to realize appropriate vehicle control according to the traffic participant and the environment around the traffic participant.

According to (8), the vehicle control method can control a vehicle to travel smoothly by offsetting at least a specific region (a risk region) corresponding to the risk index to be set on the roadway side to the sidewalk side.

DETAILED DESCRIPTION OF THE INVENTION

Hereinafter, an embodiment of a vehicle control method, a vehicle control device, and a storage medium of the present invention will be described with reference to the accompanying drawings.

[Overall Configuration]

Figure 1:
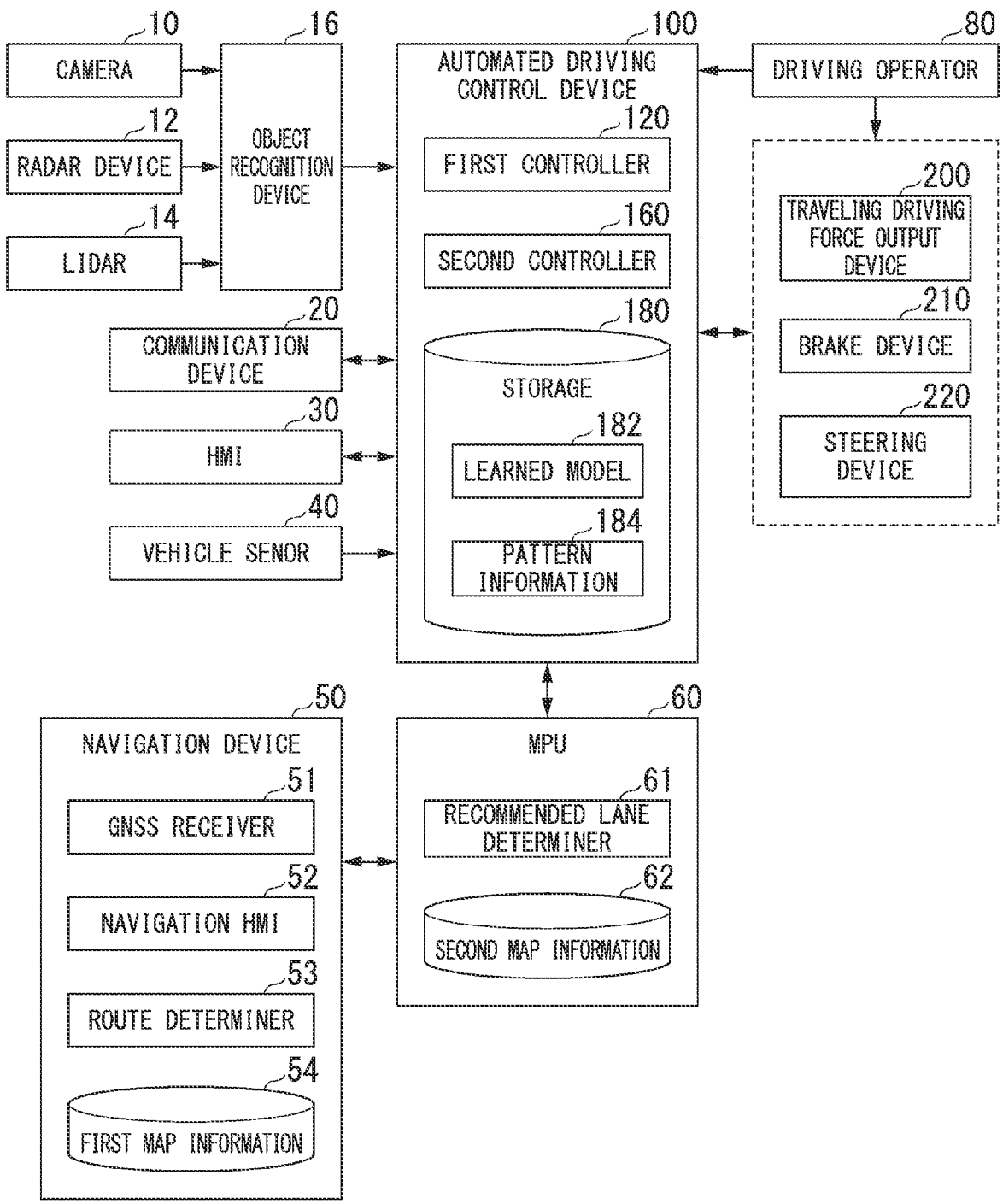
FIG. 1 is a configuration diagram of a vehicle system in which a vehicle control device according to an embodiment is used.

FIG. 1 is a configuration diagram of a vehicle system 1 in which the vehicle control device according to the embodiment is used. A vehicle having the vehicle system 1 mounted therein is, for example, a two-wheeled, three-wheeled, or four-wheeled vehicle or the like, and the driving source thereof is an internal-combustion engine such as a diesel engine or a gasoline engine, an electric motor, or a combination thereof. The electric motor operates using power generated by a generator connected to an internal-combustion engine or discharging power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle senor 40, a navigation device 50, a map positioning unit (MPU) 60, a driving operator 80, an automated driving control device 100, a traveling driving force output device 200, a brake device 210, and a steering device 220. These devices or instruments are connected to each other through a multiplex communication line such as a controller area network (CAN) communication line, a serial communication line, a wireless communication network, or the like. The configuration shown in FIG. 1 is merely an example, and some portions of the configuration may be omitted, or other configurations may be further added.

The camera 10 is a digital camera using a solid-state imaging element such as, for example, a charge coupled device (CCD) or a complementary metal oxide semiconductor (CMOS). The camera 10 is installed at any point on a vehicle having the vehicle system 1 mounted therein (hereinafter referred to as a host vehicle M). In a case where a forward image is captured, the camera 10 is installed on the upper portion of the front windshield, the rear surface of the rear-view mirror, or the like. The camera 10, for example, repeatedly captures an image of the vicinity of the host vehicle M periodically. The camera 10 may be a stereo camera.

The radar device 12 radiates radio waves such as millimeter waves to the vicinity of the host vehicle M, and detects radio waves (reflected waves) reflected from an object to detect at least the position (distance to and orientation of) of the object. The radar device 12 is installed at any point of the host vehicle M. The radar device 12 may detect the position and speed of an object with a frequency modulated continuous wave (FM-CW) system.

The LIDAR 14 irradiates the vicinity of the host vehicle M with light (or electromagnetic waves having a wavelength close to that of the light), and measures scattered light. The LIDAR 14 detects a distance to an object on the basis of a time from light emission to light reception. The irradiation light is, for example, pulsed laser light. The LIDAR 14 is installed at any point on the host vehicle M.

The object recognition device 16 recognizes the position, type, speed, or the like of an object by performing a sensor fusion process on the results of detection performed by some or all of the camera 10, the radar device 12, and the LIDAR 14. The object recognition device 16 outputs recognition result to the automated driving control device 100. The object recognition device 16 may output the detection results of the camera 10, the radar device 12, and the LIDAR 14, as they are, to the automated driving control device 100. The object recognition device 16 may be omitted from the vehicle system 1.

The communication device 20 communicates with another vehicle which is present in the vicinity of the host vehicle M using, for example, a cellular network, a Wi-Fi network, Bluetooth (registered trademark), dedicated short range communication (DSRC), or the like, or communicates with server devices of various types through a wireless base station.

The HMI 30 presents various types of information to an occupant of the host vehicle M, and accepts the occupant's input operation. The HMI 30 includes various display devices, a speaker, a buzzer, a touch panel, a switch, a key, and the like.

The vehicle sensor 40 includes a vehicle speed sensor that detects the speed of the host vehicle M, an acceleration sensor that detects an acceleration, a yaw rate sensor that detects an angular velocity around a vertical axis, an orientation sensor that detects the direction of the host vehicle M, or the like.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 identifies the position of the host vehicle M on the basis of a signal received from a GNSS satellite. The position of the host vehicle M may be specified or complemented by an inertial navigation system (INS) in which an output of the vehicle sensor 40 is used. The navigation HMI 52 includes a display device, a speaker, a touch panel, a key, and the like. A portion or the entirety of the navigation HMI 52 may be shared with the above-described HMI 30. The route determiner 53 determines, for example, a route (hereinafter, a route on a map) from the position (or any input position) of the host vehicle M specified by the GNSS receiver 51 to a destination input by an occupant using the navigation HMI 52 with reference to the first map information 54. The first map information 54 is, for example, information in which a road shape is represented by a link indicating a road and nodes connected by the link. The first map information 54 may include the curvature of a road, point of interest (POI) information, or the like. The route on a map is output to the MPU 60. The navigation device 50 may perform route guidance using the navigation HMI 52 on the basis of the route on a map. The navigation device 50 may be realized by the function of a terminal device such as, for example, a smartphone or a tablet terminal possessed by an occupant. The navigation device 50 may transmit its current position and destination to a navigation server through the communication device 20, and acquire the same route as the route on a map from the navigation server.

The MPU 60 includes, for example, a recommended lane determiner 61, and holds second map information 62 in a storage device such as an HDD or a flash memory. The recommended lane determiner 61 divides the route on a map provided from the navigation device 50 into a plurality of blocks (for example, divides the route on a map every 100 [m] in a vehicle traveling direction), and determines a recommended lane for each block with reference to the second map information 62. The recommended lane determiner 61 makes a determination on which lane from the left to travel along. In a case where a branch point is present in the route on a map, the recommended lane determiner 61 determines a recommended lane so that the host vehicle M can travel along a rational route for advancing to a branch destination.

The second map information 62 is map information having a higher accuracy than that of the first map information 54. The second map information 62 includes, for example, information of the center of a lane, information of the boundary of a lane, or the like. The second map information 62 may include road information, traffic regulations information, address information (address or zip code), facility information, telephone number information, or the like. The second map information 62 may be updated when necessary by the communication device 20 communicating with another device.

The driving operator 80 includes, for example, an accelerator pedal, a brake pedal, a shift lever, a steering wheel, a variant steering wheel, a joystick, and other operators. A sensor that detects the amount of operation or the presence or absence of operation is installed on the driving operator 80, and the detection results are output to the automated driving control device 100, or some or all of the traveling driving force output device 200, the brake device 210, and the steering device 220.

The automated driving control device 100 includes, for example, a first controller 120, a second controller 160, and a storage 180. The first controller 120 and the second controller 160 are realized by a hardware processor such as, for example, a central processing unit (CPU) executing a program (software). Some or all of these components may be realized by hardware (circuit unit; including circuitry) such as a large scale integration (LSI), an application specific integrated circuit (ASIC), a field-programmable gate array (FPGA), or a graphics processing unit (GPU), and may be realized by software and hardware in cooperation. The program may be stored in a storage device such as the HDD or the flash memory (a storage device including a non-transitory storage medium) of the automated driving control device 100 in advance, may be stored in a detachable storage medium such as a DVD or a CD-ROM, or may be installed in the HDD or the flash memory of the automated driving control device 100 by the storage medium (the non-transitory storage medium) being mounted in a drive device. The automated driving control device 100 is an example of a "vehicle control device."

The storage 180 is realized by, for example, an HDD, a flash memory, an electrically erasable programmable read only memory (EEPROM), a read only memory (ROM), a random access memory (RAM), or the like. The storage 180 stores, for example, a learned model 182 and pattern information 184. The details of the information will be described later.

Figure 2:
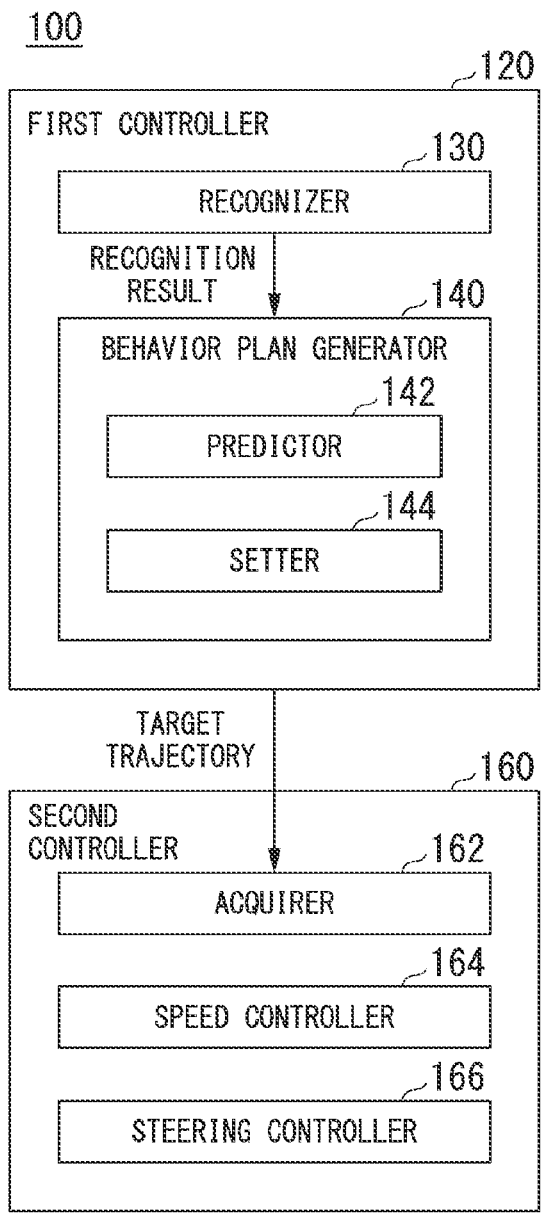
FIG. 2 is a functional configuration diagram of a first controller and a second controller.

FIG. 2 is a functional configuration diagram of the first controller 120 and the second controller 160. The first controller 120 includes, for example, a recognizer 130 and a behavior plan generator 140. The first controller 120 concurrently realizes, for example, a function based on artificial intelligence (AI) and a function based on a model imparted in advance. For example, a function of "recognizing a point of intersection" may be realized by the recognition of a point of intersection based on deep learning or the like and recognition based on conditions (such as a signal or a road sign on which pattern matching is possible) imparted in advance being concurrently executed, and being comprehensively evaluated by performing scoring on both. Thereby, the reliability of automated driving is secured.

The recognizer 130 recognizes the state of the position, speed, acceleration, or the like of an object which is located in the vicinity of the host vehicle M on the basis of information which is input from the camera 10, the radar device 12, and the LIDAR 14 through the object recognition device 16. The position of the object is recognized as, for example, a position in absolute coordinates with a representative point (such as the centroid or the center of a drive shaft) of the host vehicle M as an origin, and is used in control. The position of the object may be represented by a representative point such as the centroid or a corner of the object, or may be represented by a representative region. The "state" of the object may include the acceleration or jerk of the object, or a "behavior state" (for example, whether it is performing or attempting to perform a lane change).

The recognizer 130 recognizes, for example, a lane (traveling lane) along which the host vehicle M travels. For example, the recognizer 130 recognizes a traveling lane by comparing a pattern of a road partition line (for example, an array of solid lines and broken lines) obtained from the second map information 62 with a pattern of a road partition line located in the vicinity of the host vehicle M which is recognized from an image captured by the camera 10. The recognizer 130 may recognize a traveling lane by recognizing a driving boundary (road boundary) including a road partition line, a shoulder, a curbstone, a median strip, a guardrail, or the like without being limited to the recognition of a road partition line. In this recognition, the position of the host vehicle M acquired from the navigation device 50 or processing results based on an INS may be added. The recognizer 130 recognizes a stop line, an obstacle, a red light, a tollbooth, and other road events.

Upon recognizing a traveling lane, the recognizer 130 recognizes the position or posture of the host vehicle M with respect to the traveling lane. The recognizer 130 may recognize, for example, deviation of the host vehicle M from the center of the lane which is a reference point, and an angle formed with respect to a line aligned with the center of the lane of the host vehicle M in its traveling direction, as the relative position and posture of the host vehicle M with respect to the traveling lane. Instead, the recognizer 130 may recognize the position of the reference point of the host vehicle M or the like with respect to either lateral end portion (a road partition line or a road boundary) of the traveling lane, as the relative position of the host vehicle M with respect to the traveling lane.

The recognizer 130 recognizes, for example, the peripheral situation of the vehicle M. The recognizer 130 recognizes a roadway, a sidewalk, or a traffic participant. Examples of the traffic participant include a pedestrian on a sidewalk, a bicycle, a moving object other than the bicycle, an object having an influence on their progress, and the like.

The behavior plan generator 140 generates a target trajectory along which the host vehicle M will travel in the future automatically (irrespective of a driver's operation) so that the host vehicle M travels in the recommended lane determined by the recommended lane determiner 61 in principle and can cope with the peripheral situation of the host vehicle. The target trajectory includes, for example, a speed element. For example, the target trajectory may be represented as a trajectory obtained by arranging points (trajectory points) at which the host vehicle M will arrive in order. The trajectory points are points at which the host vehicle M will arrive after predetermined traveling distances (for example, approximately every several [m]) which are distances along a road. Separately from the trajectory points, a target speed and a target acceleration for each predetermined sampling time (for example, approximately several tenths of a [sec]) are generated as a portion of the target trajectory. The trajectory points may be positions at which the host vehicle M will arrive at sampling times for respective predetermined sampling times. In this case, information of a target speed or target acceleration is represented by an interval between trajectory points.

The behavior plan generator 140 may set automated driving events when generating a target trajectory. Examples of automated driving events include a constant-speed traveling event, a low-speed following traveling event, a lane change event, a diverging event, a merging event, an overtaking event, and the like. The behavior plan generator 140 generates a target trajectory according to a started event.

The behavior plan generator 140 includes, for example, a predictor 142 and a setter 144. The predictor 142 predicts the future position of a traffic participant recognized by the recognizer 130. The predictor 142 predicts, for example, the future position of the traffic participant on the basis of a change in the past position of the traffic participant.

The setter 144 sets a risk index for the traffic participant recognized by the recognizer 130. The details of this process will be described later.

The second controller 160 controls the traveling driving force output device 200, the brake device 210, and the steering device 220 so that the host vehicle M passes along the target trajectory generated by the behavior plan generator 140 according to scheduled times.

Referring back to FIG. 2, the second controller 160 includes, for example, an acquirer 162, a speed controller 164, and a steering controller 166. The acquirer 162 acquires information of target trajectory (trajectory point) generated by the behavior plan generator 140, and stores the acquired information in a memory (not shown). The speed controller 164 controls the traveling driving force output device 200 or the brake device 210 on the basis of a speed element associated with the target trajectory stored in the memory. The steering controller 166 controls the steering device 220 in accordance with the bent state of the target trajectory stored in the memory. The processes of the speed controller 164 and the steering controller 166 are realized by, for example, a combination of feedforward control and feedback control. As an example, the steering controller 166 executes a combination of feedforward control according to the curvature of a road in front of the host vehicle M and feedback control based on deviation from the target trajectory.

The traveling driving force output device 200 outputs a traveling driving force (torque) for a vehicle to travel to a driving wheel. The traveling driving force output device 200 includes, for example, a combination of an internal-combustion engine, an electric motor, a transmission or the like, and an electronic control unit (ECU) that controls these components. The ECU controls the above components in accordance with information which is input from the second controller 160 or information which is input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor in accordance with the information which input from the second controller 160 or the information which input from the driving operator 80, and causes a brake torque according to a braking operation to be output to each wheel. The brake device 210 may include a mechanism that transfers hydraulic pressure generated by the operation of a brake pedal included in the driving operator 80 through a master cylinder to the cylinder as a backup. The brake device 210 is not limited to the above-described configuration, and may be an electronic control type hydraulic brake device that controls an actuator in accordance with the information which is input from the second controller 160 and transfers hydraulic pressure of the master cylinder to the cylinder.

The steering device 220 includes, for example, a steering ECU and an electric motor. The electric motor changes the direction of a turning wheel, for example, by causing a force to act on a rack and pinion mechanism. The steering ECU drives the electric motor in accordance with the information which is input from the second controller 160 or the information which is input from the driving operator 80, and changes the direction of the turning wheel.

[Process of Setting Risk Region]

The setter 144 sets a risk potential (a risk index) for a position at which a traffic participant will be present in the future on the basis of the ease of entry of the traffic participant from a sidewalk to a roadway adjacent to the sidewalk in a region that the traffic participant traveling on the sidewalk will enter in the future. The setter 144 increases the risk potential to be set on the roadway side as there is a greater tendency for the traffic participant to enter the roadway. The wording "increase the risk potential to be set on the roadway side" involves a risk region on the roadway side being set to be larger as there is a greater tendency for the traffic participant to enter the roadway, or a risk potential in the risk region on the roadway side being set to be higher as there is a greater tendency for the traffic participant to enter the roadway.

The term "risk region" refers to a region in which a risk potential is set. The term "risk potential" refers to an index value indicating the magnitude of a risk in a case where the vehicle M enters a region in which the risk potential is set. The risk region is a region in which the risk potential that is an index value of a predetermined magnitude (an index value exceeding zero) is set. The term "ease of entry" refers to the degree of ease of entry which is estimated on the basis of a structure at a boundary between the roadway and the sidewalk. In the following description, the traffic participant is assumed to be a bicycle, but the traffic participant may be a pedestrian or another moving object.

Figure 3:
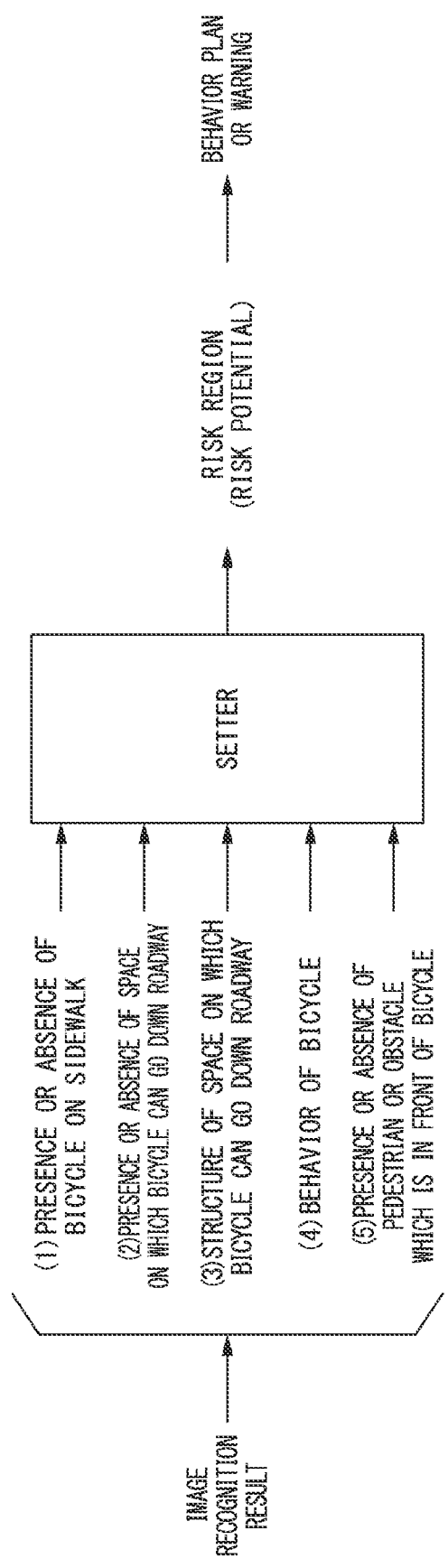
FIG. 3 is a diagram for explaining an outline of processing of setting a risk region.

FIG. 3 is a diagram for explaining an outline of processing of setting a risk region. The setter 144 sets a risk region on the basis of the following information (1) to (5).

(1) Information on the presence or absence of a bicycle on the sidewalk
(2) Information on the presence or absence of a space on which the bicycle can go down the roadway
(3) Information on the structure of a space on which the bicycle can go down the roadway
(4) Information on the behavior of a bicycle
(5) Information on the presence or absence of a pedestrian or an obstacle which is in front of a bicycle The above (1) to (5) are information recognized by the recognizer 130 on the basis of a recognition result of an image captured by the camera 10. For example, the above (1) or (5) may be recognized by the recognizer 130 on the basis of a detection result of the LIDAR 14.

The automated driving control device 100 controls a vehicle-mounted instrument on the basis of a risk region which is set by the setter 144. For example, the automated driving control device 100 generates a behavior plan for the vehicle M on the basis of the risk region, and controls the vehicle M in accordance with the behavior plan. The automated driving control device 100 causes a speaker or a display to display information (a warning) for causing an occupant of the vehicle M to stare at a bicycle on the basis of the risk region.

(1. Information on Presence or Absence of Bicycle on Sidewalk)

Figure 4:
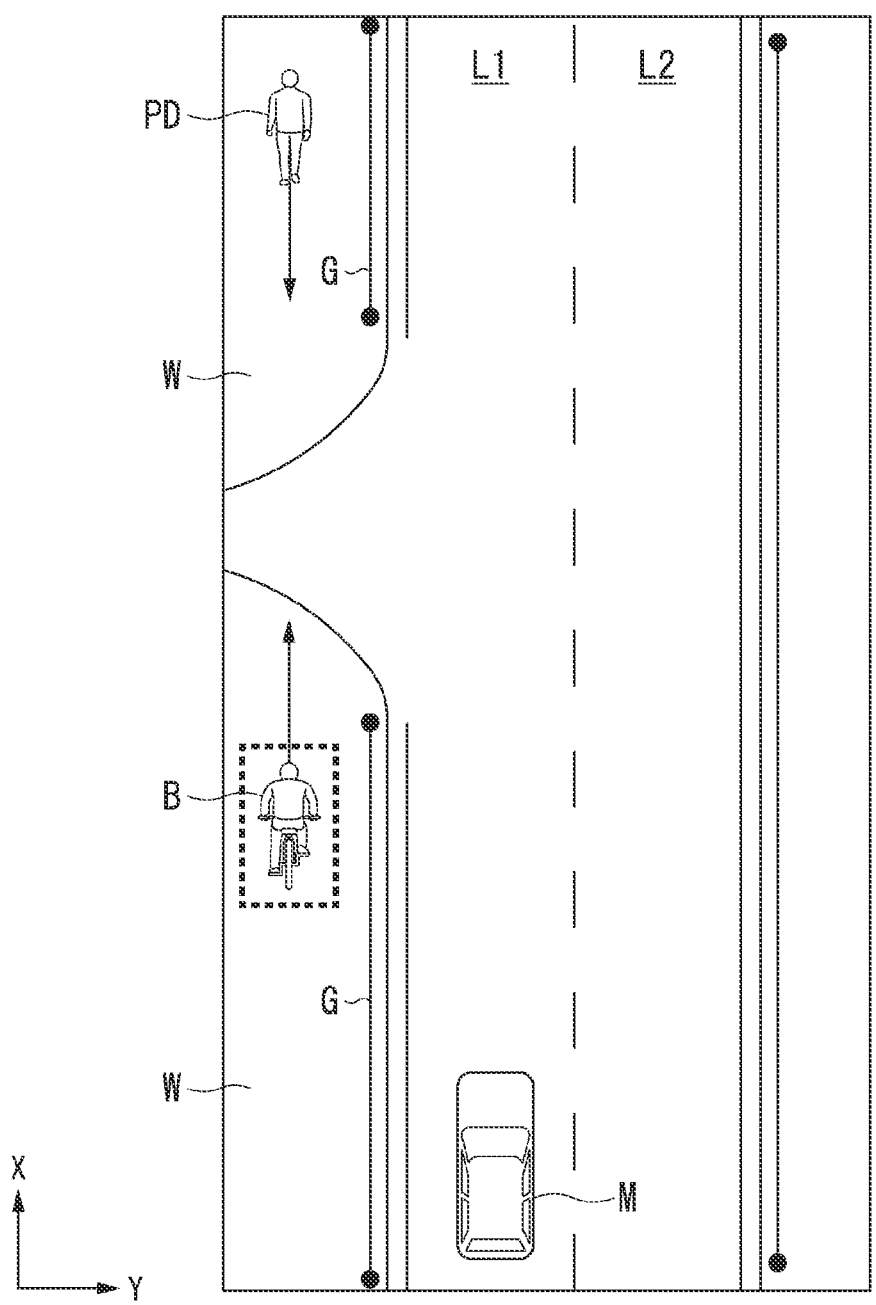
FIG. 4 is a diagram for explaining information on the presence or absence of a bicycle.

FIG. 4 is a diagram for explaining information on the presence or absence of a bicycle. Hereinafter, the traveling direction of the vehicle M may be defined as an X direction, and the width direction of the vehicle M may be defined as a Y direction. As shown in the drawing, there are a roadway including a lane L1 and a lane L2, and a sidewalk W. The vehicle M is traveling in the lane L1. A bicycle B is present on the sidewalk W, and is traveling in the same direction (+X direction) as the traveling direction of the vehicle M. A pedestrian PD is present on the sidewalk in front of the vehicle M and the bicycle B, and is traveling in a −X direction. A guardrail G is provided between the roadway and the sidewalk W.

The recognizer 130 recognizes the bicycle B which is in front of the vehicle M. The setter 144 acquires K_cyc(k) on the basis of Expression (1-1). In a case where there is the bicycle B on the sidewalk, K_cyc(k) is "1." In a case where there is no bicycle B on the sidewalk, K_cyc(k) is "0."

$$K\_cyc(k) = \begin{cases} 1 \text{ (there is bicycle on sidewalk)} \\ 0 \text{ (there is no bicycle on sidewalk)} \end{cases} \quad (1\text{-}1)$$

(2. Information on Presence or Absence of Space on which Bicycle can go Down Roadway)

Figure 5:
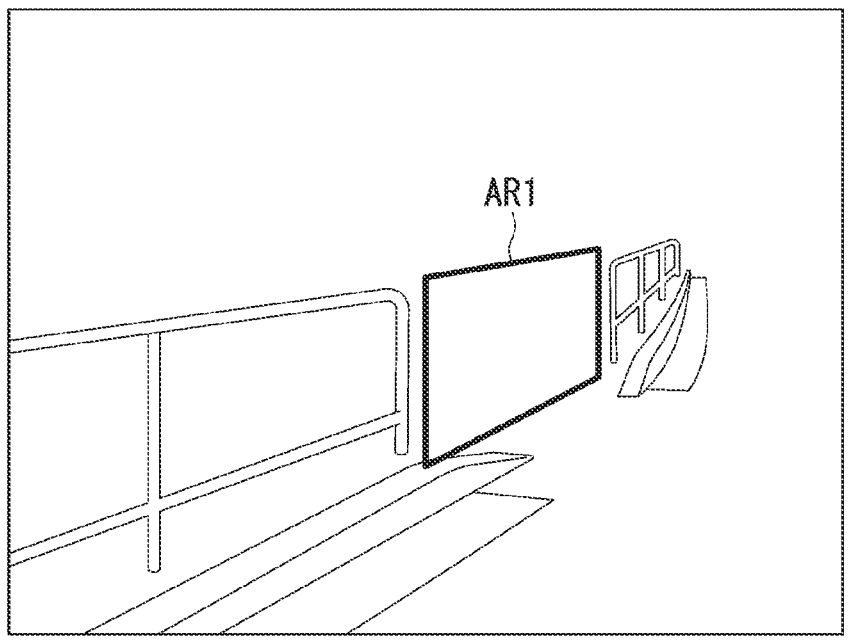
FIG. 5 is a diagram showing an example of a break in a guardrail G provided between a sidewalk W and a roadway.
Figure 6:
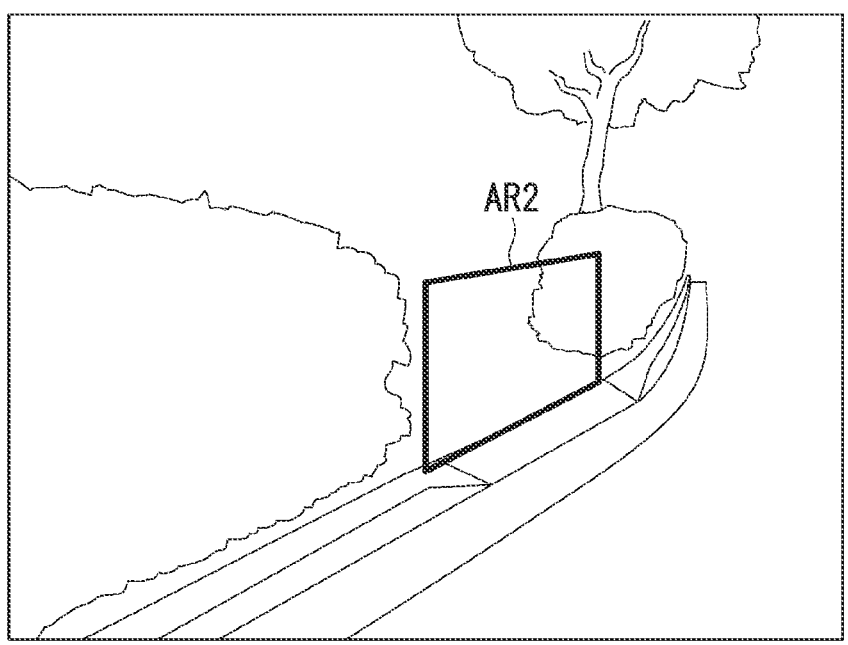
FIG. 6 is a diagram showing an example of a break in a plantation provided between the sidewalk W and the roadway.

The recognizer 130 recognizes the presence or absence of a region where the bicycle B can enter the roadway from the sidewalk W in front of the bicycle B. The wording "region where the bicycle can enter the roadway from the sidewalk W" refers to a region AR1 of a break in the guardrail G provided between the sidewalk W and the roadway as shown in FIG. 5, or a region of a break in a fence provided between the sidewalk W and the roadway. The wording "region where the bicycle can enter the roadway from the sidewalk W" refers to a region AR2 of a break in a plantation provided between the sidewalk W and the roadway as shown in FIG. 6.

The setter 144 acquires K_gu(k) on the basis of Expression (1-2). In a case where there is a break, K_gu(k) is "1." In a case where there is no break, K_gu(k) is "0."

$$K\_gu(k) = \begin{cases} 1 \text{ (there is break in guardrail, fence, or plantation)} \\ 0 \text{ (there is no break in guardrail, fence, or plantation)} \end{cases} \quad (1\text{-}2)$$

(3. Information on Structure of Space on which Bicycle can go Down Roadway)

Figure 7:
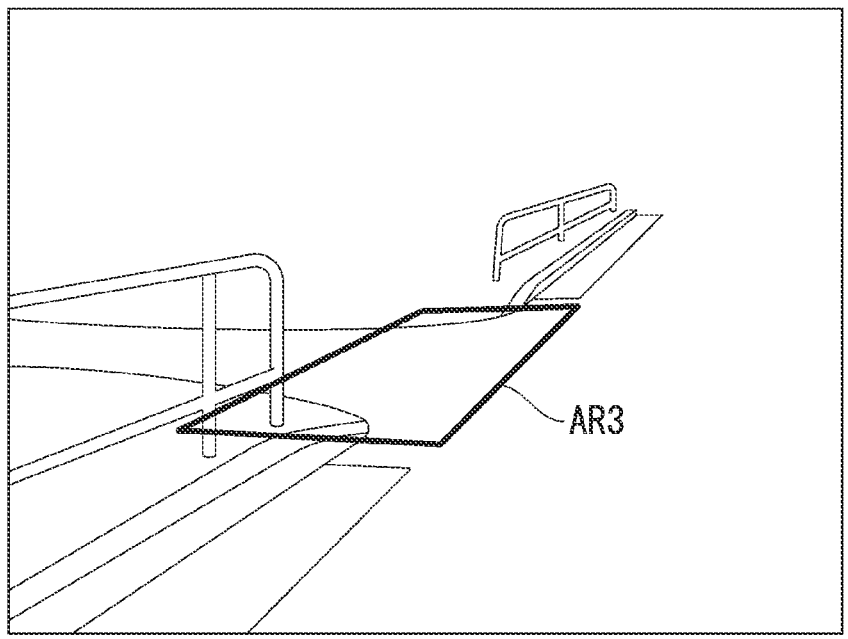
FIG. 7 is a diagram showing an example of a structure (A).

The recognizer 130 recognizes the type of a region where the bicycle B can enter the roadway from the sidewalk W in front of the bicycle B. The type includes the types of the following structures (A) to (E) shown in FIGS. 7 to 11. FIG. 7 is a diagram showing an example of the structure (A). The structure (A) is a structure such as a side road provided on the roadway (a region AR3 in FIG. 7), a road intersecting the roadway, or an entrance to a parking lot.

For example, the recognizer 130 recognizes the above structure using the learned model 182 or the pattern information 184. The learned model 182 is a model that, when an image is input, outputs information indicating the type of structure of the image. The learned model 182 is a model in which learning data including an image containing the above structure and information indicating the type of structure of the image is learned. The pattern information 184 is information in which the type of structure and the feature amount of the structure are associated with each other. The feature amount is a feature such as the degree of change in a luminance value obtained from an image. The recognizer 130 compares, for example, the feature amount obtained from an image captured by the camera 10 with the feature amount of the pattern information 184, and identifies the type of structure on the basis of the comparison result.

Figure 8:
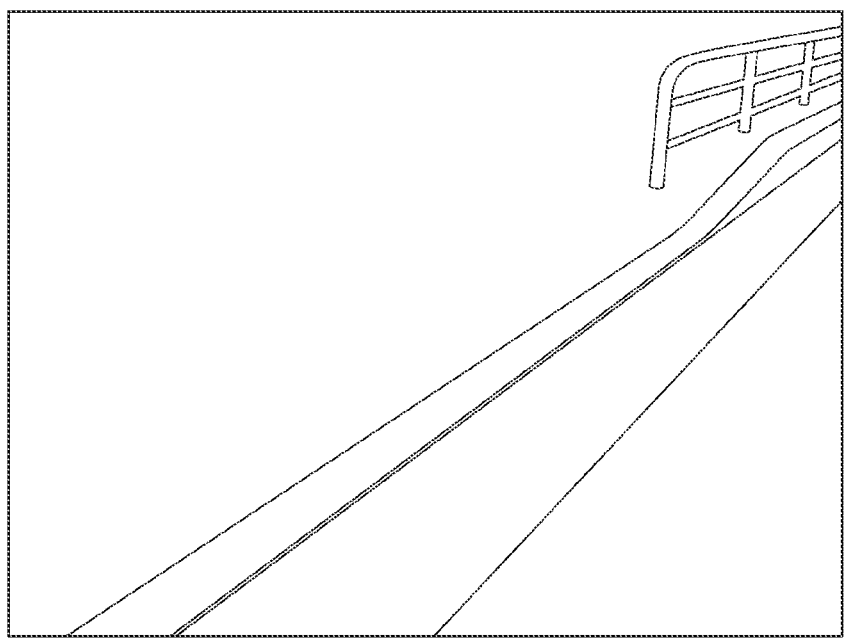
FIG. 8 is a diagram showing an example of a structure (B).

FIG. 8 is a diagram showing an example of the structure (B). The structure (B) is a structure in which a step difference (a curbstone) provided between the roadway and the sidewalk is equal to or less than a first height (for example, 3 cm). In the structure (B), for example, the height of the sidewalk is equal to or less than the first height with respect to the height of the roadway. The structure (B) is, for example, a barrier-free curbstone.

Figure 9:
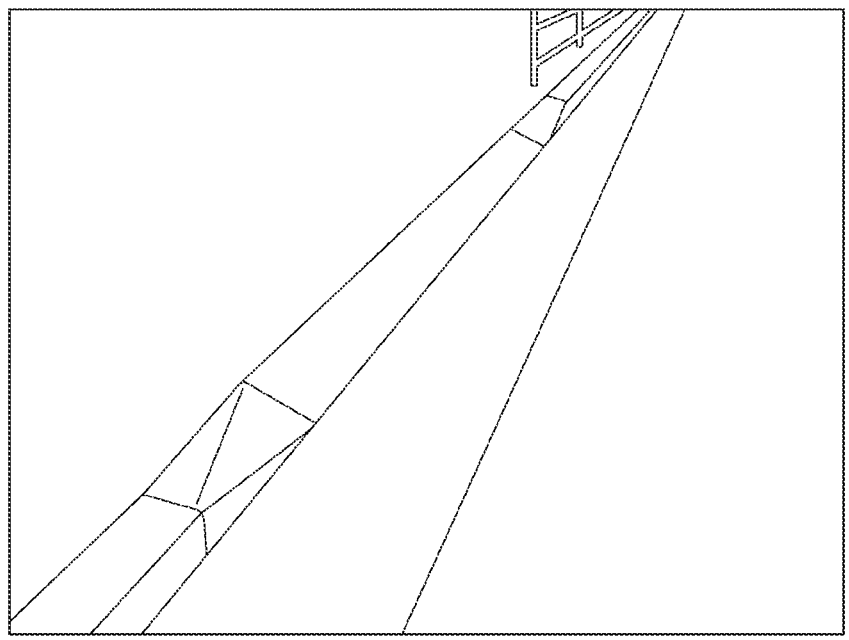
FIG. 9 is a diagram showing an example of a structure (C).

FIG. 9 is a diagram showing an example of the structure (C). The structure (C) is a structure in which a slope is provided between the roadway and the sidewalk.

Figure 10:
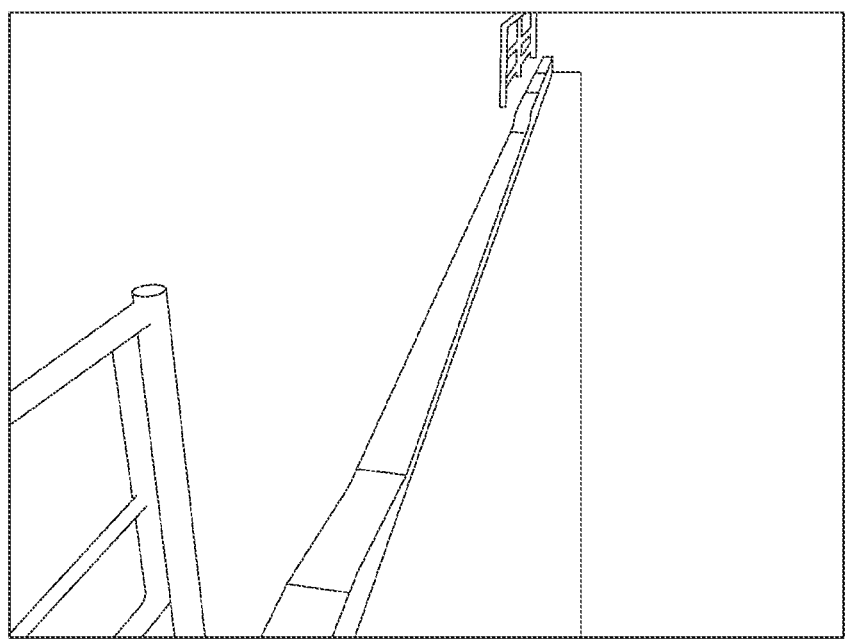
FIG. 10 is a diagram showing an example of a structure (D).

FIG. 10 is a diagram showing an example of the structure (D). The structure (D) is a structure in which a step difference (a curbstone) provided between the roadway and the sidewalk is equal to or less than a second height (for example, 5 cm) exceeding the first height. The structure (D) is, for example, a structure in which the height of the sidewalk is equal to or less than the second height with respect to the height of the roadway.

Figure 11:
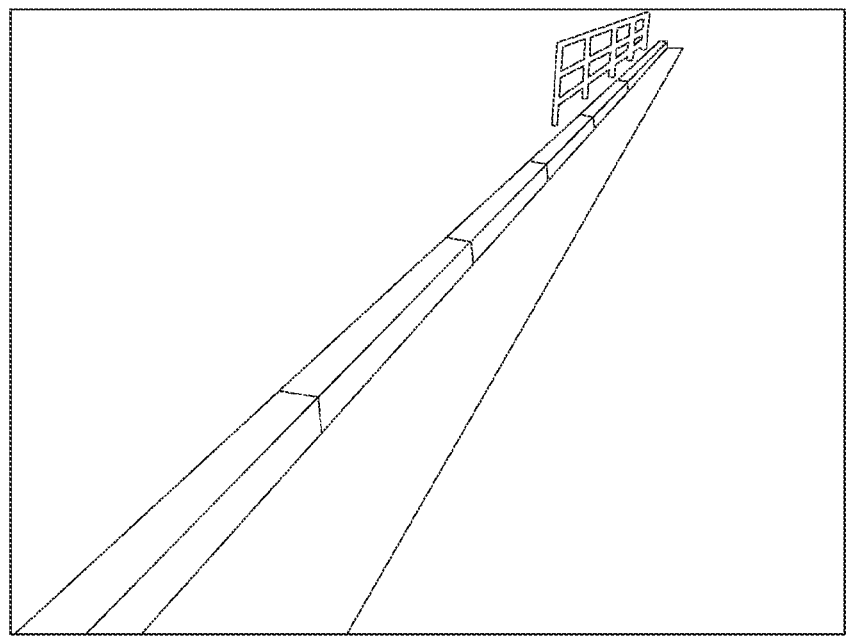
FIG. 11 is a diagram showing an example of a structure (E).

FIG. 11 is a diagram showing an example of the structure (E). The structure (E) is a structure in which a step difference (a curbstone) provided between the roadway and the sidewalk exceeds the second height. The structure (E) is, for example, a curbstone provided for the purpose of separating the sidewalk and the roadway. The structure (E) is, for example, a structure in which the height of the sidewalk is approximately a third height (10 cm) higher than the height of the roadway.

$$K\_st(k) = \begin{cases} 3 & \text{structure}(A) \\ 2 & \text{structure}(B) \\ 1 & \text{structure}(C) \\ 1 & \text{structure}(D) \\ 0 & \text{structure}(E) \end{cases} \tag{1-3}$$

(4. Information on Behavior of Bicycle)

The recognizer 130 recognizes the behavior of the bicycle B (or an occupant). The behavior is a behavior in which the bicycle B is expected to enter the roadway. The behavior is a behavior in which the face, head, or body of the occupant is directed (has been directed) toward the roadway, or a behavior in which the bicycle B tilts toward the roadway. For example, the setter 144 sets a risk potential to be set on the roadway side when a traffic participant's face or body is directed toward the roadway side to be larger than a risk potential to be set on the roadway side when the traffic participant's face or body is not directed toward the roadway side.

Figure 12:
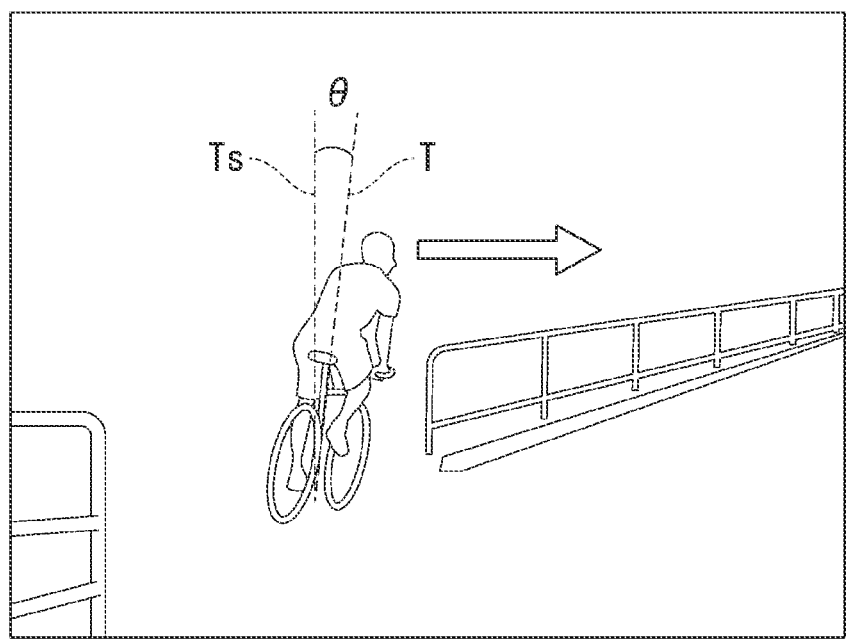
FIG. 12 is a diagram showing an example of a bicycle tilting toward a roadway.

FIG. 12 is a diagram showing an example of the bicycle B tilting toward the roadway. For example, when the face of the occupant of the bicycle B is directed in a lateral direction (the direction of the roadway with respect to the extending direction of the sidewalk) by a predetermined angle or more with respect to the extending direction, the recognizer 130 recognizes that the bicycle B has behaved to enter the roadway because it looks in the direction of the roadway.

The setter 144 sets a risk potential to be set on the roadway side when the central axis of a traffic participant or a moving object tilts in a vertical direction to be larger than a risk potential to be set on the roadway side when the central axis of the traffic participant or the moving object does not tilt in a vertical direction. For example, in a case where the recognizer 130 recognizes that the bicycle B tilts toward the roadway side (tilts by a predetermined degree or more in a vertical direction) rather than the bicycle is upright, the recognizer recognizes that the bicycle B has behaved to enter the roadway. For example, as shown in FIG. 12, in a case where the central axis of the bicycle B tilts at an inclination of an angle θ and in a direction T with respect to a vertical direction Ts, the recognizer 130 recognizes that the bicycle B has behaved to enter the roadway.

In a case where the occupant of the bicycle B sticks his or her hand toward the roadway side to enter the roadway, the recognizer 130 may recognizes that the bicycle B has behaved to enter the roadway.

The setter 144 acquires K_fd(k) on the basis of Expression (1-4). In a case where the occupant of the bicycle B looks in the direction of the roadway within a predetermined time in the past from the present, D_fd(k) is "1." In a case where the occupant of the bicycle B does not look in the direction of the roadway within a predetermined time in the past from the present, D_fd(k) is "0."

$$D\_fd(k) = \begin{cases} 1 & (\text{look roadway direction within predetermined time in past from present}) \\ 0 & (\text{do not look roadway direction within predetermined time in past from present}) \end{cases} \tag{1-4}$$

The setter 144 acquires K_st(k) on the basis of Expression (1-3). In the case of the structure (A), K_st(k) is "3." In the case of the structure (B), K_st(k) is "2." In the case of the structure (C) or the structure (D), K_st(k) is "1." In the case of the structure (E), K_st(k) is "0."

The setter 144 acquires D_bank(k) on the basis of Expression (1-5). In a case where the bicycle tilts toward the roadway by a predetermined angle or more in a reference direction (a vertical direction), K_bank(k) is "1." In a case where the bicycle does not tilt toward the roadway by a predetermined angle or more in a reference direction (a vertical direction), K_bank(k) is "0."

$$D\_bank(k) = \begin{cases} 1 \text{ (bicycle tilts toward roadway)} \\ 0 \text{(bicycle does not tilts towards roadway)} \end{cases} \quad (1\text{-}5)$$

(5. Information on Presence or Absence of Pedestrian or Obstacle which is in Front of Bicycle)

Figure 13:
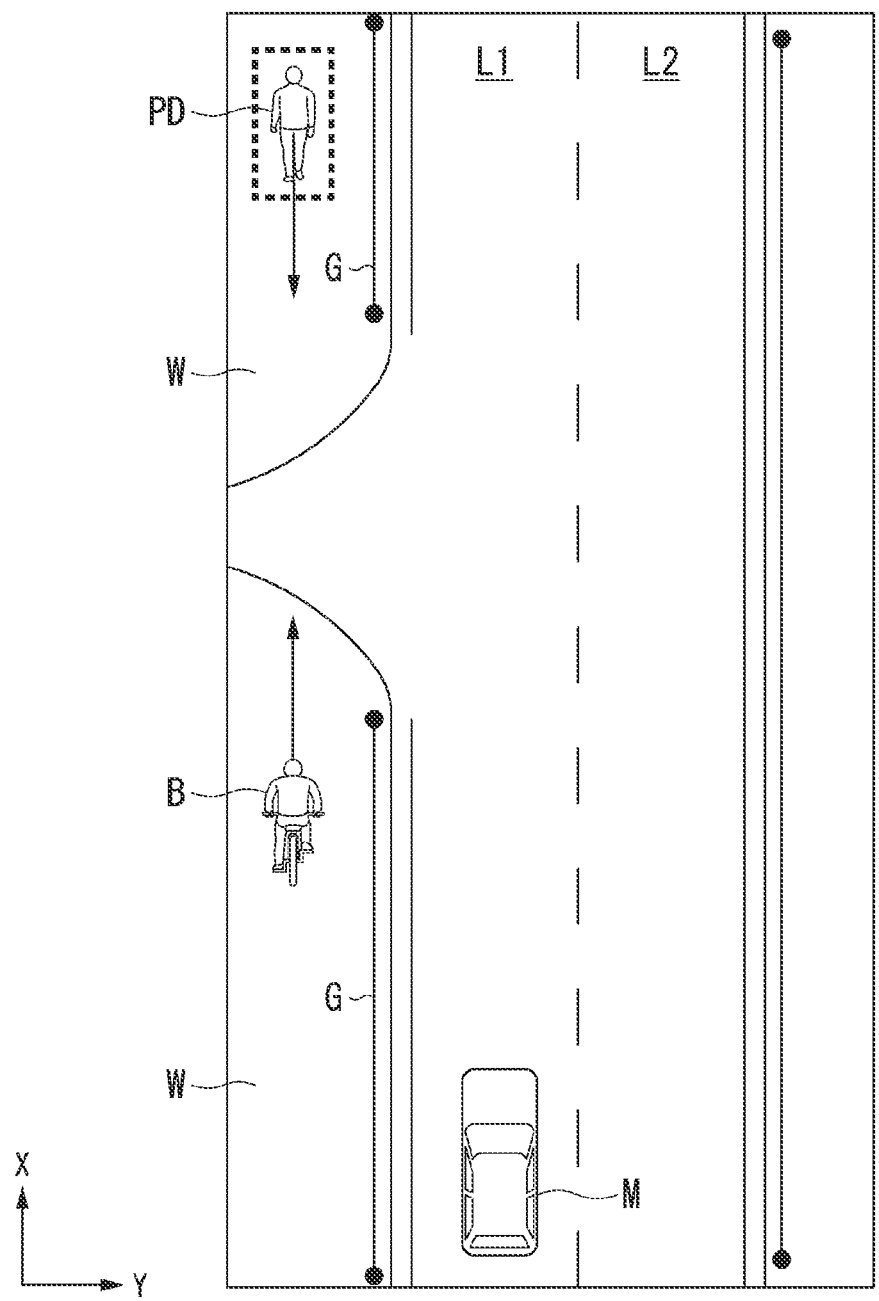
FIG. 13 is a diagram showing an example of a pedestrian PD who is in front of a bicycle.

The recognizer 130 recognizes the pedestrian PD or an obstacle which is in front of the bicycle B FIG. 13. The pedestrian or the obstacle is, for example, an object having an influence on traveling of the bicycle B when the bicycle B travels on the sidewalk. The wording "having an influence on" involves, for example, the bicycle B slowing down, or there being a possibility of the bicycle B interfering. In this case, the width of the roadway may be taken into consideration. For example, as the roadway becomes wider, the degree of influence of a pedestrian or an obstacle in front of the bicycle B may become lower.

The setter 144 acquires K_obs(k) on the basis of Expression (1-6). In a case where there is a pedestrian or an obstacle in front of the bicycle B, D_obs(k) is "3." In a case where there is no pedestrian or obstacle in front of the bicycle B, D_obs(k) is "0."

$$D\_obs(k) = \begin{cases} 3 \text{ (there is pedestrian or obstacle in front of bicycle)} \\ 0 \text{(there is no pedestrian or obstacle in front of bicycle)} \end{cases} \quad (1\text{-}6)$$

(Process of Deriving Risk Region)

The setter 144 integrates the above information (1) to (5) and sets a risk region. The setter 144 integrates, for example, scores (risk levels) obtained in Expressions (1-1) to (1-6) to derive an integrated score, and sets a risk region on the basis of the derived integrated score. As the integrated score becomes larger, for example, the risk region to be set on the roadway side increases. As the integrated score becomes larger, for example, the risk potential of the risk region to be set on the roadway side may be set to become larger.

The setter 144 acquires Risk_level(k) which is an integrated score on the basis of Expression (1-7). Risk_level(k) is a score obtained by multiplying a first score and a second score together. The first score is a score obtained by multiplying K_cyc(k), K_gu(k), and K_st(k) together. The second score is a score obtained by adding a reference value (for example, "1"), D_fd(k), D_bank(k), and D_obs(k).

$$\text{Risk\_level}(k) = K\_cyc(k)K\_gu(k)K\_st(k) \times (1 + D\_fd(k) + D\_bank(k) + D\_obs(k)) \quad (1\text{-}7)$$

In a case where K_gu(k) is "0" as stated above, the risk level is set to "0" or a predetermined value. That is, the setter 144 sets a risk potential to be set on the roadway side when the structure of a boundary between the sidewalk and the roadway is a structure in which a traffic participant can enter the roadway from the sidewalk (a structure that makes it easy to enter the roadway) to be larger than a risk potential to be set on the roadway side when the structure is a structure that makes it impossible to enter it.

The risk level is set in accordance with the score of K_st(k) as described above. That is, the setter 144 sets the risk potential in accordance with the type of structure of a boundary between the sidewalk and the roadway (for example, the ease of entry into the roadway such as the type of curbstone).

The risk level is set in accordance with the score of K_fd(k) as described above. For example, when the traffic participant looks in the direction of the roadway, the setter 144 sets the risk region to be larger than the risk region when the traffic participant does not look the direction of the roadway.

The risk level is set in accordance with the score of D_bank(k) as described above. For example, the setter 144 sets a risk potential to be set on the roadway side when the central axis of the traffic participant tilts in a vertical direction to be larger than a risk potential to be set on the roadway side when the central axis of the traffic participant does not tilt in the vertical direction.

The risk level is set in accordance with the score of D_obs(k) as described above. The setter 144 sets a risk potential to be set on the roadway side when there is an object having an influence on traveling of the traffic participant in front of a region that the traffic participant traveling on the sidewalk will enter in the future to be larger than a risk potential to be set on the roadway side when there is no object having an influence on the traveling of the traffic participant.

Each score used in the above (1-1) to (1-6) is an example, and the score may be appropriately set. In deriving the integrated score, a predetermined function may be used instead of the above (1-7).

(Process Based on Risk Region)

Figure 14:
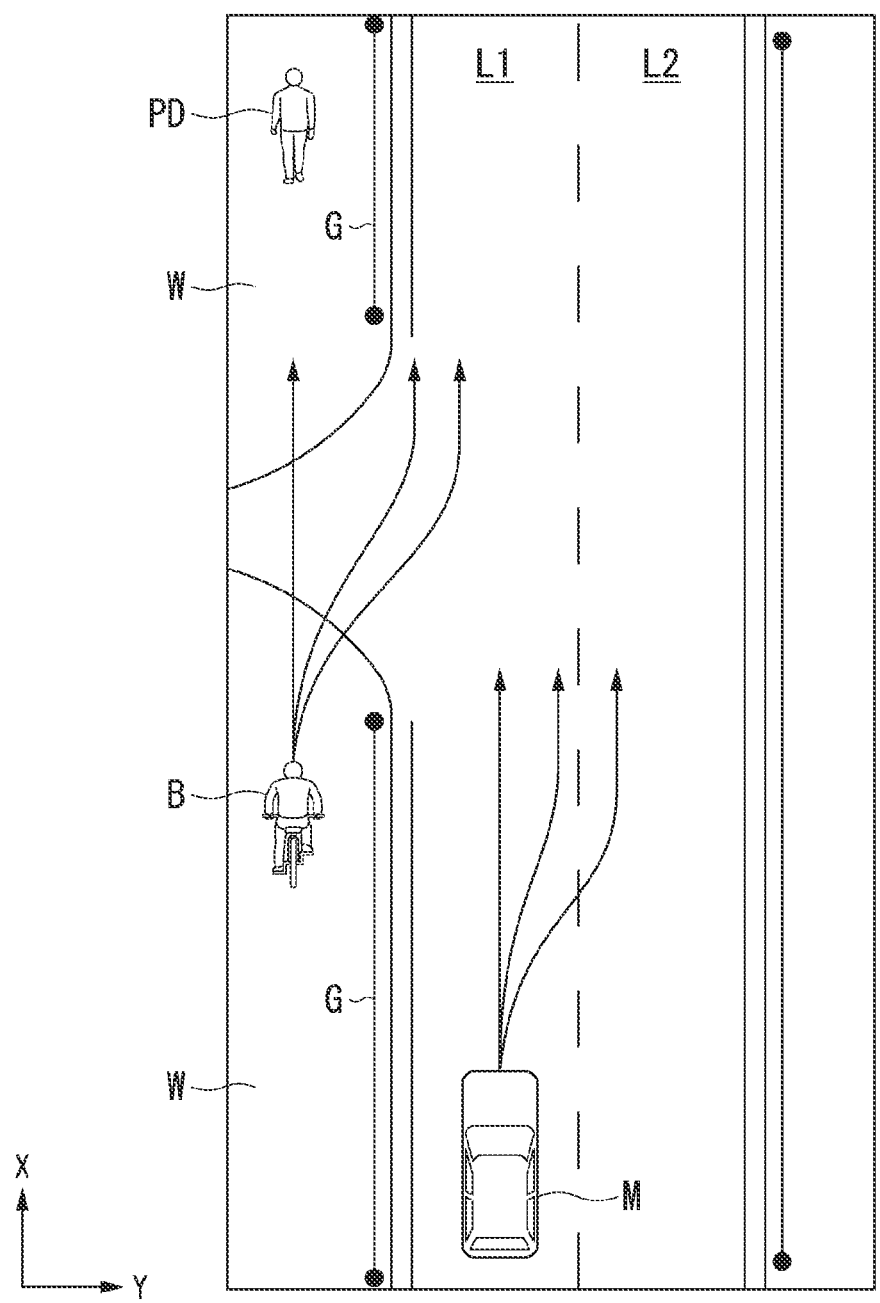
FIG. 14 is a diagram showing an example of a risk region, a behavior plan, and a behavior of a vehicle M.

The automated driving control device 100 controls vehicle-mounted instruments of the vehicle M on the basis of the risk region which is set by the setter 144. For example, the automated driving control device 100 generates a behavior plan for the vehicle M in the risk region, and controls the vehicle M on the basis of the generated behavior plan. FIG. 14 is a diagram showing an example of a risk region, a behavior plan, and a behavior of the vehicle M. For example, as the risk region expands to the roadway side, the vehicle M is controlled to travel in a position on the +Y direction side so as to avoid the risk region.

In the above example, although it has been described that the vehicle M performs automated driving, the vehicle may have a driving assistance function in addition thereto (or instead thereof). The driving assistance function is a function in which at least one of the speed or steering of the vehicle M is executed by the control device of the vehicle M. Examples of the driving assistance function include an adaptive cruise control (ACC) system that controls the vehicle M so as to travel while maintaining a constant inter-vehicle distance from a preceding vehicle, a lane keeping assist system (LKAS) that controls the vehicle M so as to travel while maintaining a distance from a road partition line to a predetermined distance, and the like.

In a case where the driving assistance function is executed, the automated driving control device 100 notifies the occupant of the vehicle M of a warning in accordance with the risk region. For example, as the risk region expands to the roadway side, the degree of warning notification is increased. Examples of the warning include a warning using a voice, a warning using an image, a warning using a vibration of a steering wheel, and the like.

In a case where the vehicle M has an AI concierge function, the AI concierge may execute processing in accordance with the risk region. The AI concierge is a function of using artificial intelligence to talk with an occupant or to assist the occupant in driving. For example, in a case where the risk region is equal to or greater than a first threshold and is less than a second threshold, the AI concierge performs indirect guidance. The indirect guidance involves indirectly guiding the occupant's operation. For example, an output device provides the occupant with information indicating that the bicycle B has a high risk of entering the roadway through the AI concierge function, and guides the occupant not to approach the risk region having a high risk.

For example, in a case where the risk region is equal to or greater than the second threshold, the AI concierge performs direct guidance. The direct guidance involves directly guiding the occupant's operation. For example, the automated driving control device 100 guides the vehicle M to a position away from the risk region or guides the vehicle not to approach it by directly controlling the steering or speed of the vehicle M not to approach the risk region through the AI concierge function.

(Example of Risk Potential)

Figure 15:
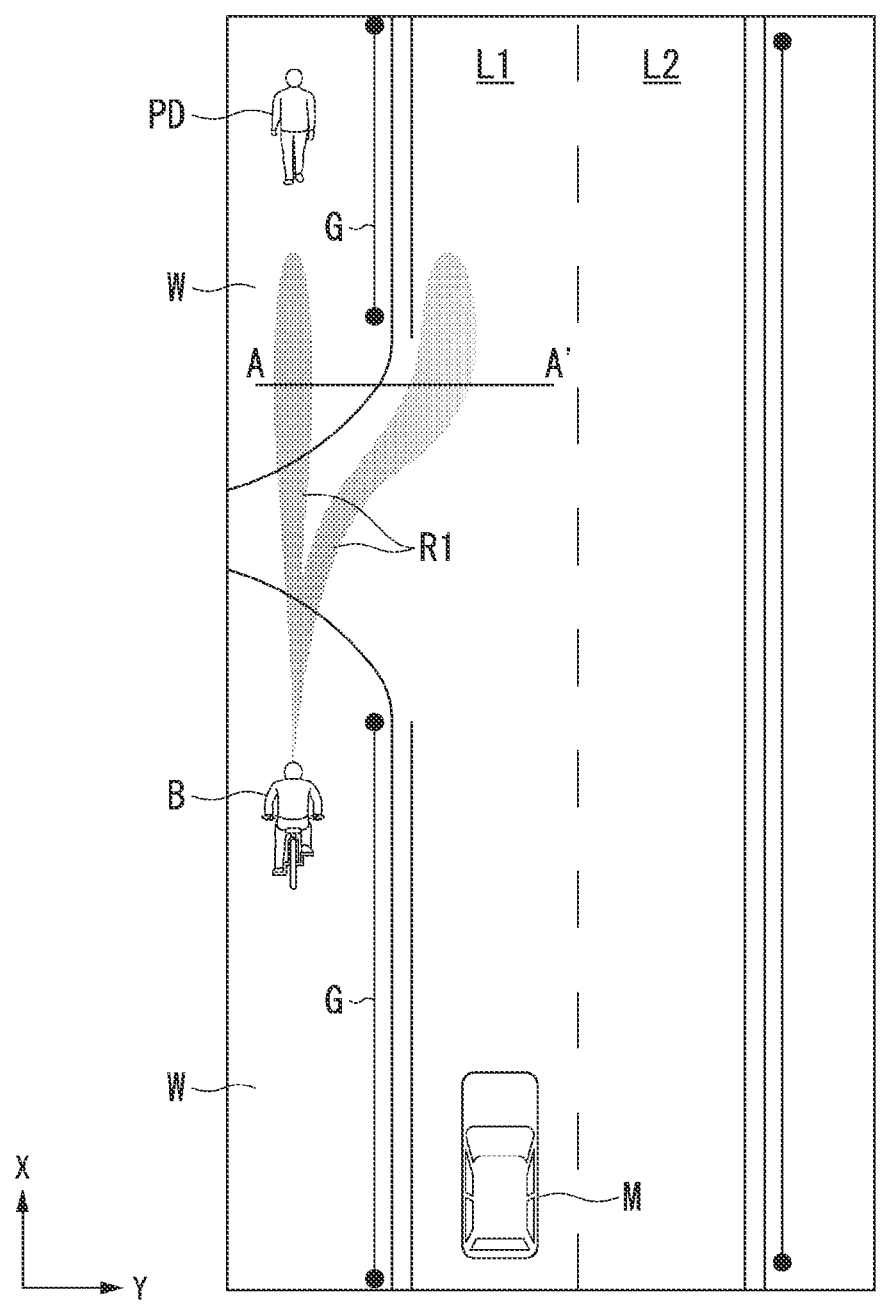
FIG. 15 is a diagram showing an example of a risk region and a risk potential in the risk region.

FIG. 15 is a diagram showing an example of a risk region and a risk potential in the risk region. The setter 144 predicts the future trajectory of the bicycle B, and sets a risk potential and a risk region on the basis of the existence probability of each future time on the predicted trajectory. FIG. 15 shows a risk region R1 including a risk potential which is set with respect to the trajectory of the bicycle B at time t+1, time t+2, . . . time t+n with reference to the current time t. For example, as time elapses from time t, the risk region indicating the possibility of the bicycle B existing is dispersed.

Figure 16:
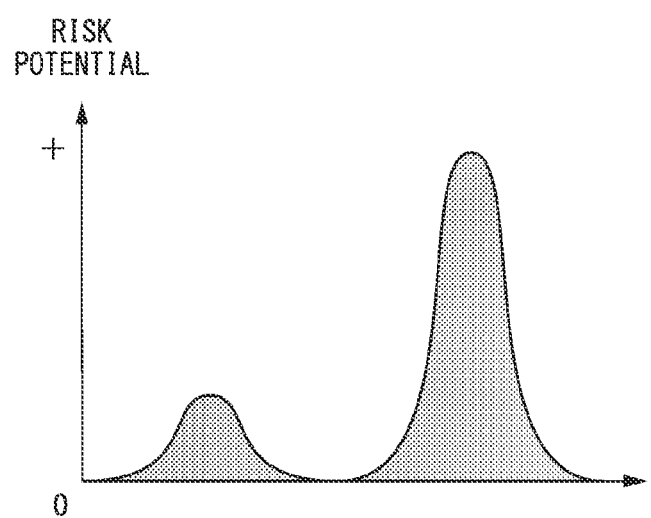
FIG. 16 is a diagram showing an example of the magnitude of a risk potential in A-A' of a risk region R1 of FIG. 15.

FIG. 16 is a diagram showing an example of the magnitude of a risk potential in A-A' of the risk region R1 of FIG. 15. A-A' of the risk region R1 is a risk region where it is estimated that the bicycle B exists at time t+x. For example, in a case where it is estimated that the possibility of the bicycle B traveling on the roadway is higher than the possibility of the bicycle traveling on the sidewalk, the risk potential on the roadway side is set to be larger than the risk potential on the sidewalk side.

(Another Example of Risk Potential)

The setter 144 may set a risk region as follows instead of the above-described risk region setting method. The predictor 142 predicts the position X (for example, position in an X direction) of the bicycle B after a predetermined time (every unit time in the future) on the basis of the speed, acceleration, and movement direction included in the past behavior history of the bicycle B. The setter 144 sets a risk region for the position of the bicycle B after a predetermined time on the basis of the possibility of the bicycle B entering the roadway side obtained by the above-described process.

Further, the setter 144 offsets the set risk region to the sidewalk side. In a case where at least the risk potential is equal to or greater than a threshold, the setter 144 offsets at least a specific region corresponding to the risk potential to be set on the roadway side to the sidewalk side.

Figure 17:
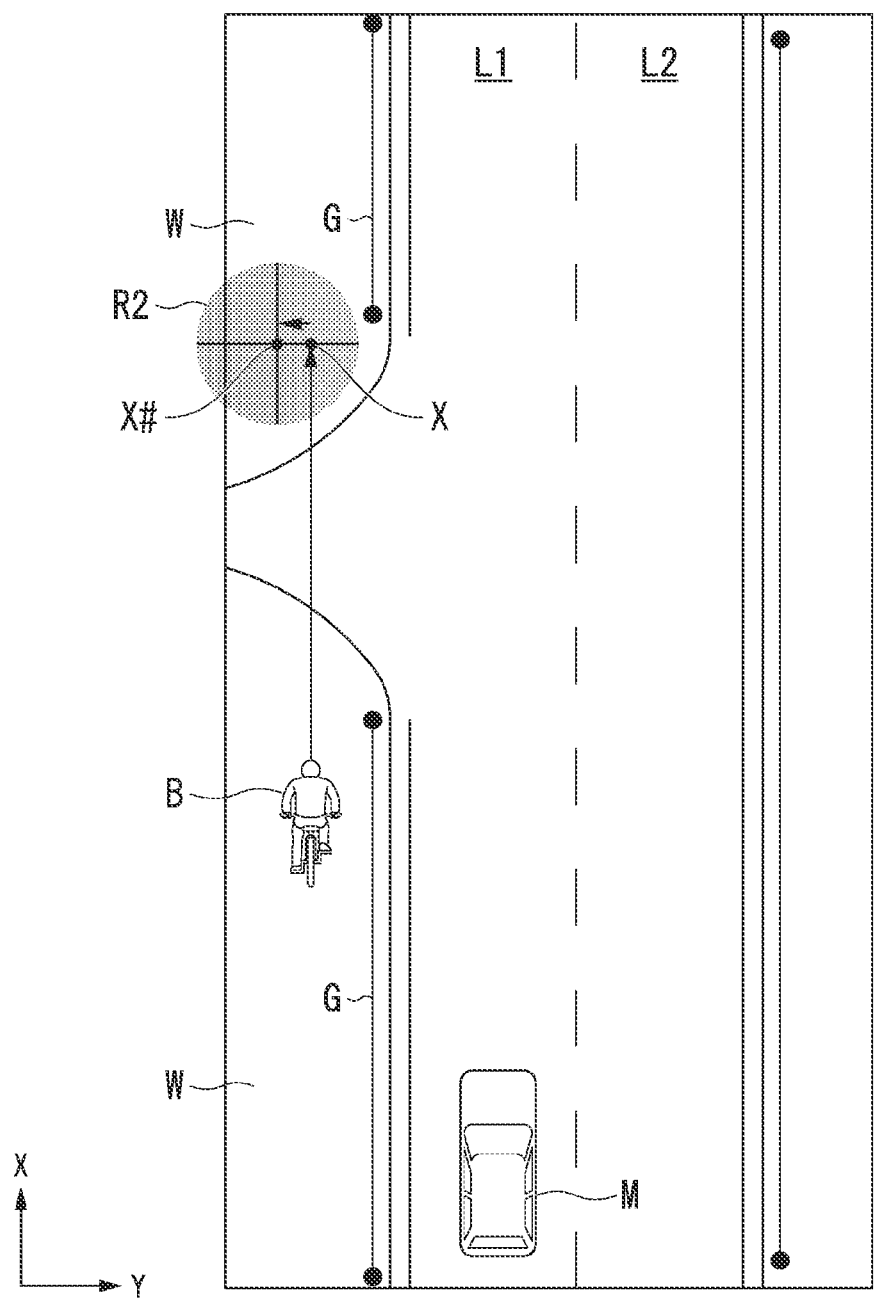
FIG. 17 is a diagram showing an example of a risk region R2 which is set in a case where the possibility of a bicycle entering the roadway side is relatively low.

FIG. 17 is a diagram showing an example of a risk region R2 which is set in a case where the possibility of the bicycle B entering the roadway side is relatively low. The setter 144 sets a risk region around the position X of the bicycle B after a predetermined time, and then sets the risk region R2 with the center of the risk region as an offset to a position X #.

Figure 18:
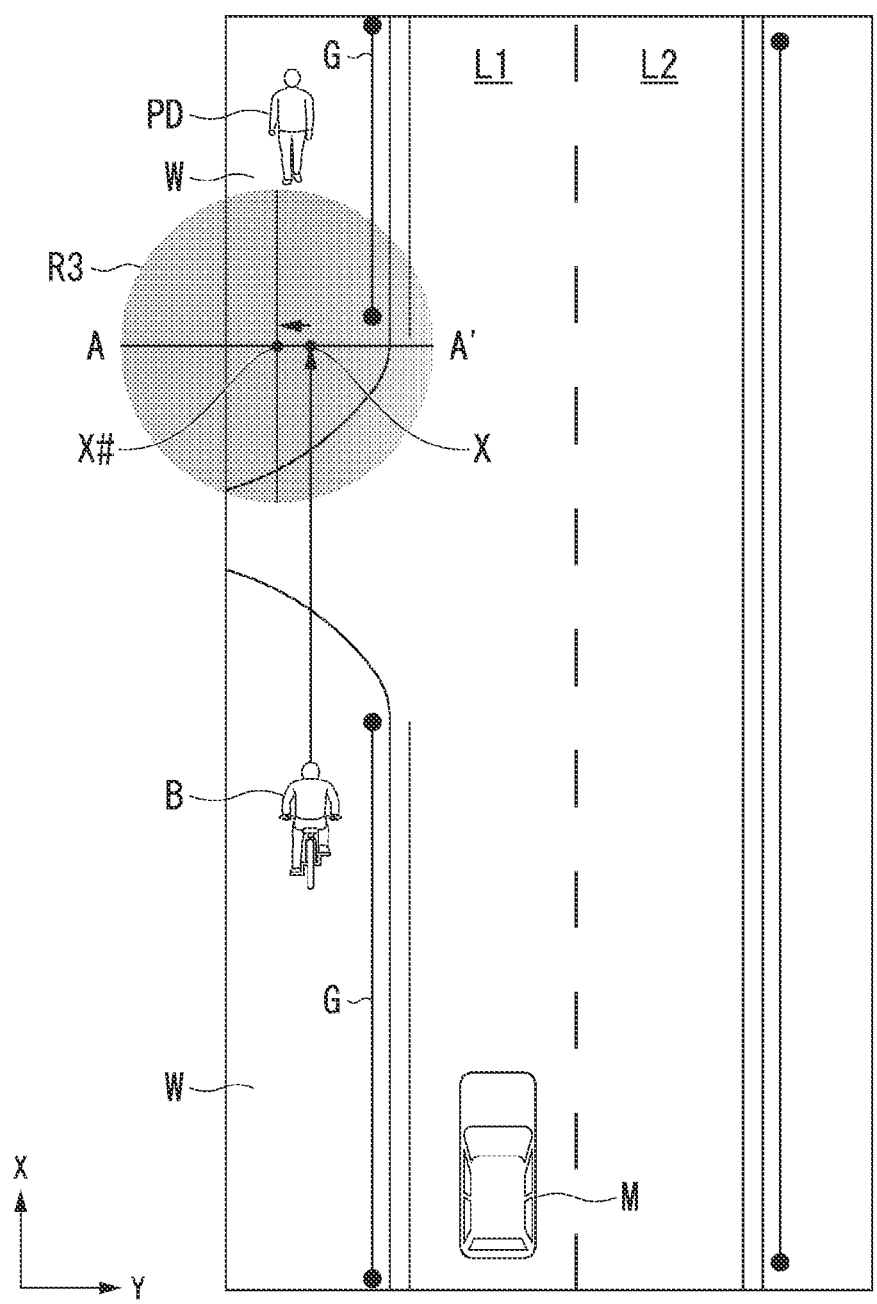
FIG. 18 is a diagram showing an example of a risk region R3 which is set in a case where the possibility of the bicycle entering the roadway side is relatively high.

FIG. 18 is a diagram showing an example of a risk region R3 which is set in a case where the possibility of the bicycle B entering the roadway side is relatively high. The setter 144 sets a risk region around the position X of the bicycle B after a predetermined time, and then sets the risk region R3 with the center of the risk region as an offset to a position X #. The risk region R3 is a region larger than the risk region R2. The risk region R2 and the risk region R3 are, for example, circular regions.

Figure 19:
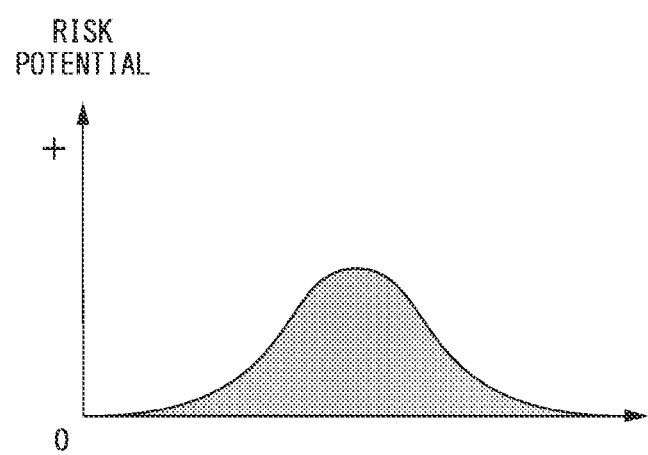
FIG. 19 is a diagram showing an example of the risk potential which is set in A-A' of FIG. 18.

FIG. 19 is a diagram showing an example of the risk potential which is set in A-A' of FIG. 18. The setter 144 sets, for example, a risk potential by adjusting the magnitude of the risk potential for each position and the distribution of the risk potential in a Y direction on the basis of the predicted possibility of the bicycle B entering the roadway side. The setter 144 sets a risk potential on the basis of a map or a function which is set in advance. The map is, for example, a map in which the distribution of the risk potential is associated with the probability of the bicycle B traveling on the sidewalk and the probability of the bicycle entering the roadway.

As described in (Example of risk potential), predicting the probability of the bicycle B existing on the future trajectory of the bicycle B may impose a heavy processing load on the automated driving control device. In this case, this is because the automated driving control device 100 needs to observe the state of the bicycle B in more detail, or needs to perform a complicated process in order to eliminate uncertainty. This is because the behavior of the bicycle B is highly uncertain due to the great influence of an occupant's intention.

On the other hand, in (Another example of risk potential), the automated driving control device 100 can set a risk region more easily by setting the risk region (risk potential) on the basis of the future position of the bicycle B predicted based on the speed of the bicycle B, the magnitude and distribution of the risk potential, and the possibility of the bicycle B entering the roadway.

Figure 20:
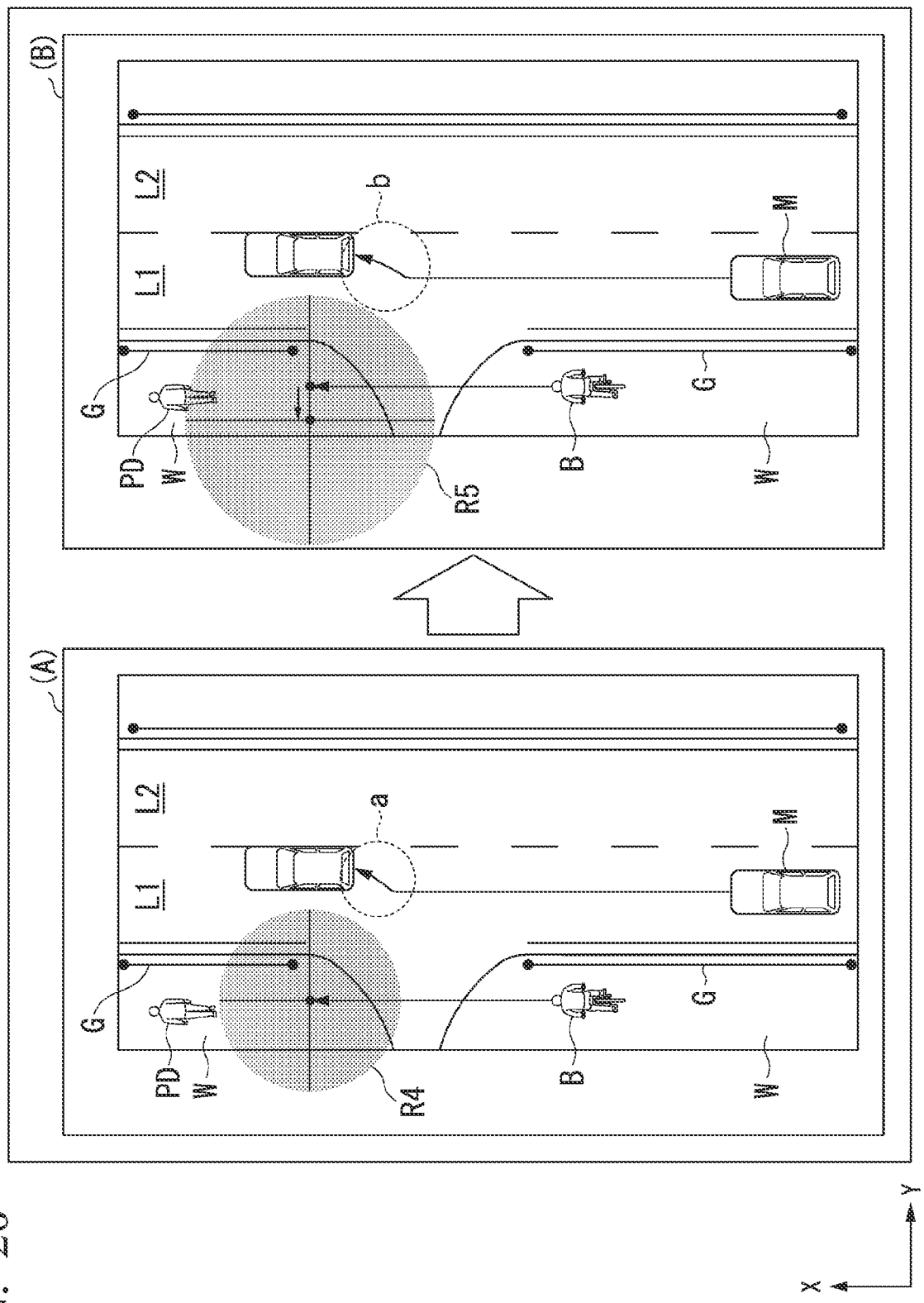
FIG. 20 is a diagram of comparison between the behaviors of the vehicle M in a case where a risk region is not offset and a case where it is offset.

Since the risk region is offset to the sidewalk side, the vehicle M can travel smoothly while avoiding the risk region. FIG. 20 is a diagram of comparison between the behaviors of the vehicle M in a case where a risk region is not offset and a case where it is offset. For example, as shown in (A) of FIG. 20, in a case where a risk region R4 is not offset, the vehicle travels in an arc shape on the +Y direction side of the risk region R4 on the basis of the arc of the risk region R4 in order to avoid the risk region R4. In this case, a change in the amount of steering when the vehicle M starts to avoid the traffic participant becomes drastic, which makes the riding uncomfortable and makes an occupant feel uneasy.

On the other hand, as shown in (B) of FIG. 20, in a case where a risk region R5 is offset and the risk region R5 is further expanded, a change in the amount of steering becomes gentle, which leads to an improvement in ride comfort, thereby allowing a sense of security to be given to the occupant. The vehicle M travels in an arc shape on the +Y direction side of the risk region R5 on the basis of the arc of the risk region R5 in order to avoid the risk region R5. In this case, a change in the amount of steering when the vehicle M starts to avoid the traffic participant is suppressed more than the change in the amount of steering in (A) of FIG. 20. This is because the curvature of the arc of the risk region R5 is smaller than the curvature of the arc of the risk region R4. For example, the curvature of the trajectory of a region b in (B) of FIG. 20 is smaller than the curvature of the trajectory of a region a in (A) of FIG. 20. In this manner, the vehicle M can avoid the risk region R5 on a gentle trajectory. Further, a drastic change in the amount of steering of the vehicle M is suppressed, which leads to an improvement in ride comfort, thereby allowing the occupant's anxiety to be reduced. The offset distance or the degree of expansion of the risk region R5 is appropriately set in accordance with the risk of the bicycle B entering the roadway side or the surrounding environment. For example, the position of the end portion of the risk region R5 on the +Y direction side is set to match the position of the end portion of the risk region R4 on the +Y direction side before offset.

Conclusion

Figure 21:
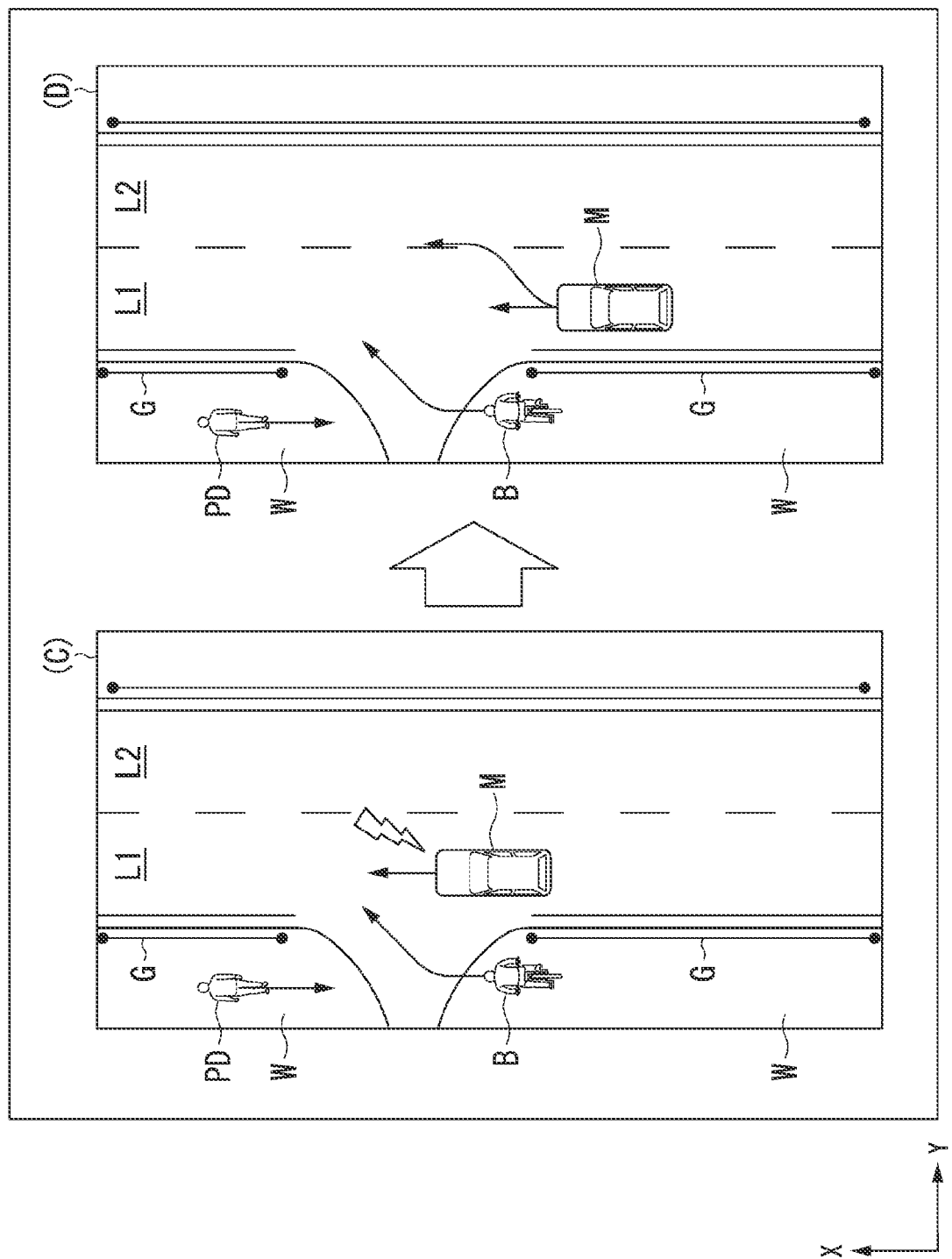
FIG. 21 is a diagram for comparing a behavior of a vehicle of a comparative example with a behavior of a vehicle of the present embodiment.

FIG. 21 is a diagram for comparing a behavior of a vehicle of a comparative example with a behavior of a vehicle of the present embodiment. In the comparative example, the risk of the bicycle B entering the roadway side is not sufficiently taken into consideration, and thus when the bicycle B enters, for example, the roadway from between a fence and a fence, the vehicle M needs to turn sharply or cause a brake device to output a strong braking force in order to keep a sufficient distance from the bicycle B (see (C) of FIG. 21).

On the other hand, in the present embodiment, the risk of the bicycle B entering the roadway side is sufficiently taken into consideration, and thus even when the bicycle B enters, for example, the roadway from between a fence and a fence, the vehicle M predicts the behavior of the bicycle B in advance, thereby allowing a sufficient distance from the bicycle B to be kept with a margin. Therefore, the vehicle M suppresses turning sharply or causing a brake device to output a strong braking force (see (D) of FIG. 21).

In the present embodiment, since the risk region is set while reducing a processing load and the risk region is further offset, the vehicle M can travel on a smooth trajectory and proceed while avoiding the risk region.

According to the embodiment described above, the automated driving control device 100 sets a risk potential for a position at which a traffic participant will be present in the future on the basis of the ease of entry of the traffic participant from a sidewalk to a roadway adjacent to the sidewalk in a region that the traffic participant traveling on the sidewalk will enter in the future, and increases the risk potential to be set on the roadway side as there is a greater tendency for the traffic participant to enter the roadway, so that it is possible to realize appropriate vehicle control according to the traffic participant and the environment around the traffic participant.

[Hardware Configuration]

Figure 22:
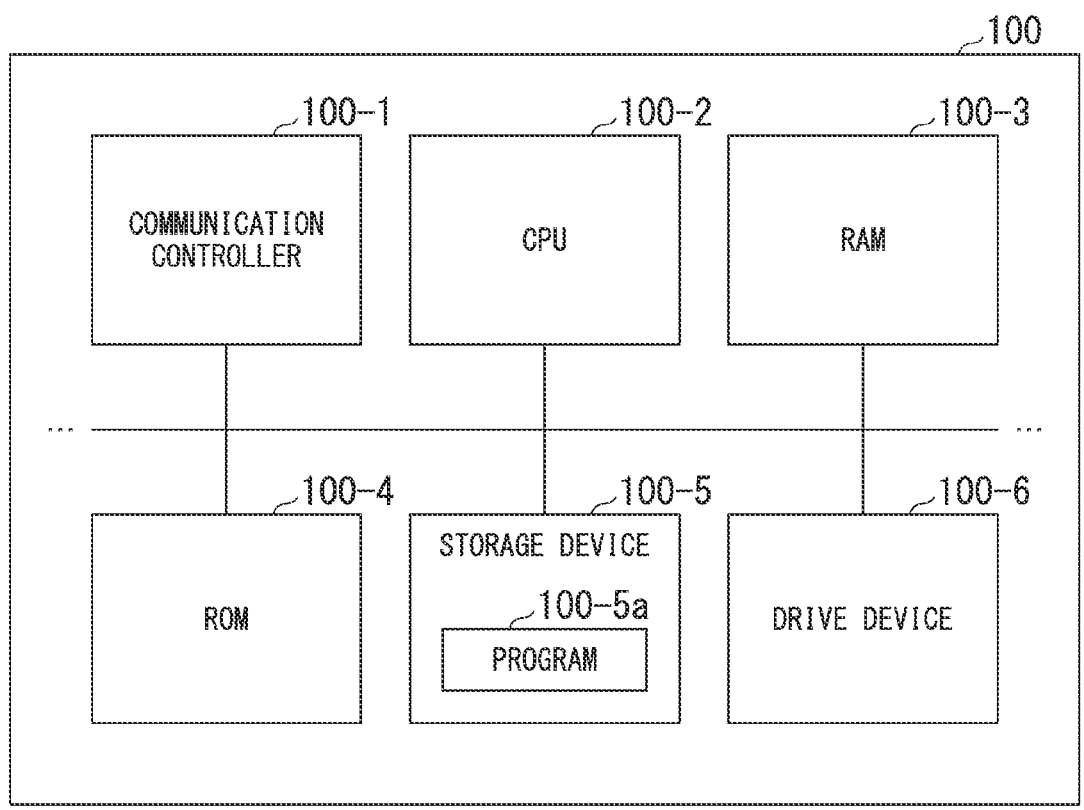
FIG. 22 is a diagram showing an example of a hardware configuration of an automated driving control device of an embodiment.

FIG. 22 is a diagram showing an example of a hardware configuration of the automated driving control device 100 according to an embodiment. As shown in the drawing, the automated driving control device 100 is configured such that a communication controller 100-1, a CPU 100-2, a random access memory (RAM) 100-3 used as a working memory, a read only memory (ROM) 100-4 that stores a boot program or the like, a storage device 100-5 such as a flash memory or a hard disk drive (HDD), a drive device 100-6, and the like are connected to each other through an internal bus or a dedicated communication line. The communication controller 100-1 performs communication with components other than the automated driving control device 100. The storage device 100-5 stores a program 100-5a executed by the CPU 100-2. This program is developed into the RAM 100-3 by a direct memory access (DMA) controller (not shown) or the like, and is executed by the CPU 100-2. Thereby, some or all of the first controller 120, the second controller 160, and functional units included in these controllers are realized.

The above-described embodiment can be represented as follows.

A vehicle control device including:
a storage device having a program stored therein; and
a hardware processor, wherein the hardware processor executes the program stored in the storage device, to thereby
recognize a vicinity of a vehicle,
set a risk region for a recognized traffic participant,
control a vehicle-mounted instrument of the vehicle on the based on the set risk region, and
set a potential for position at which the traffic participant will be present in the future on the based on ease of entry of the traffic participant from a sidewalk to a roadway adjacent to the sidewalk in a region that the traffic participant traveling on the sidewalk will enter in the future, and increase a potential to be set on the roadway side as there is a greater tendency for the traffic participant to enter the roadway.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control method comprising:
recognizing a vicinity of a vehicle;
setting a risk index for a recognized traffic participant;
controlling a vehicle-mounted instrument of the vehicle based on the risk index; and
setting the risk index for a position at which the traffic participant will be present in the future based on ease of entry of the traffic participant from a sidewalk to a roadway adjacent to the sidewalk in a region that the traffic participant traveling on the sidewalk will enter in the future, and increasing the risk index to be set on the roadway side as there is a greater tendency for the traffic participant to enter the roadway,
wherein, in a case where the traffic participant and an another traffic participant are on the sidewalk and the another traffic participant is in front of the traffic participant, and at least the risk index is less than a threshold, setting a first specific region corresponding to the risk index around a first position corresponding to the traffic participant,
in a case where the traffic participant and an another traffic participant are on the sidewalk and the another traffic participant is in front of the traffic participant, and at least the risk index is equal or greater than a threshold, setting a second specific region corresponding to the risk index around a second position corresponding to the traffic participant,
the second specific region is larger than the first region,
the second position is in which altering the first position to an opposite direction of a road side, and
the first position and the second position are set between:
a position of the traffic participant, and
the another traffic participant in a longitudinal direction of the sidewalk or a travelling direction of the traffic participant.

2. The vehicle control method according to claim 1, further comprising:
controlling a speed and steering of the vehicle based on the risk index.

3. The vehicle control method according to claim 1, further comprising:

controlling an output device to output information for making an occupant of the vehicle to stare at the traffic participant based on the risk index.

4. The vehicle control method according to claim 1, wherein the traffic participant is a bicycle.

5. The vehicle control method according to claim 1, further comprising:
setting a risk index to be set on the roadway side when a structure of a boundary between the sidewalk and the roadway is a structure in which the traffic participant is able to enter the roadway from the sidewalk to be larger than the risk index to be set on the roadway side when the structure is a structure that makes it impossible to enter the roadway.

6. The vehicle control method according to claim 5, wherein the structure includes a slope, a curbstone that is equal to or less than a first height, and a curbstone that is higher than the first height.

7. The vehicle control method according to claim 1, further comprising:
setting the risk index in accordance with a type of structure of a boundary between the sidewalk and the roadway.

8. The vehicle control method according to claim 7, wherein the structure is a type of curbstone provided at the boundary.

9. The vehicle control method according to claim 1, further comprising:
wherein, in a case where at least the risk index is equal or greater than a threshold, altering a specific region corresponding to the risk index to be set on the roadway side to the sidewalk side.

10. The vehicle control method according to claim 1, further comprising:
setting the risk index to be set on the roadway side when the traffic participant's face or body is directed toward the roadway side to be larger than the risk index to be set on the roadway side when the traffic participant's face or body is not directed toward the roadway side.

11. The vehicle control method according to claim 1, wherein the traffic participant includes a person or a moving object that a person is on board, and
the vehicle control method further comprising:
setting the risk index to be set on the roadway side when a central axis of the traffic participant or the moving object tilts in a vertical direction to be larger than a risk index to be set on the roadway side when the central axis of the traffic participant or the moving object does not tilt in the vertical direction.

12. The vehicle control method according to claim 1, further comprising:
setting the risk index to be set on the roadway side when there is an object having an influence on traveling of the traffic participant in front of a region that the traffic participant traveling on the sidewalk will enter in the future to be larger than the risk index to be set on the roadway side when there is no object having an influence on the traveling of the traffic participant.

13. The vehicle control method according to claim 1, wherein the first specific region and the second specific region is circular region, a center of the first specific region is the first position, and a center of the second specific region is the second position.

14. The vehicle control method according to claim 1, further comprising:
when the traffic participant is recognized, wherein the traffic participant is in front of the vehicle and the traffic participant moves on the sidewalk adjacent to the roadway,
recognizing a presence or an absence of a region, wherein the region is a region in which the traffic participant is able to enter the roadway from the sidewalk that is in front of the participant,
recognizing a type of structure of a boundary between the sidewalk and roadway, in a case where there is the region, and
recognizing a presence or an absence of the another traffic participant in front of the traffic participant, in a case where the traffic participant is moving on the sidewalk, wherein the another traffic participant interfering with a moving of the traffic participant,
setting the risk index for the position at which the traffic participant will be present in the future based on a presence or an absence of another traffic participant and the type of structure,
setting a first risk index on the roadway side, in a case where the type of structure is a first type and the another traffic participant is present, and
setting a second risk index on the roadway side, in a case where the type of structure is the first type and the another traffic participant is not present,
wherein the first risk index is index that is a greater tendency for the traffic participant to enter the roadway compared with the second risk index.

15. The vehicle control method according to claim 14, further comprising:
setting the risk index based on a score, wherein the score is a score integrated a score based on the type of structure and a score based on the presence or the absence of another traffic participant.

16. The vehicle control method according to claim 14, wherein the traffic participant is bicycle, and wherein the method further comprises:
setting a third risk index to be set on the roadway side when the type of structure is a first type, the another traffic participant is present, and the traffic participant's face, head, or body is directed toward the roadway side, and
setting a fourth risk index smaller than the third risk index to be set on the roadway side when the type of structure is a first type, the another traffic participant is present, and the traffic participant's face, head, or body is not directed toward the roadway side.

17. The vehicle control method according to claim 14, wherein the traffic participant is bicycle, and wherein the method further comprises:
setting a fourth risk index to be set on the roadway side when the type of structure is a first type, the another traffic participant is present, the traffic participant's face, head, or body is directed toward the roadway side, and a central axis of traffic participant tilt toward the roadway side, and
setting a five risk index smaller than the fourth risk index to be set on the roadway side when the type of structure is a first type, the another traffic participant is present, the traffic participant's face, head, or body is directed toward the roadway side, and a central axis of the traffic participant does not tilt toward the roadway side.

18. The vehicle control method according to claim 1, further comprising:

when the traffic participant is recognized, wherein the traffic participant is in front of the vehicle and the traffic participant moves on the sidewalk adjacent to the roadway,
  recognizing a presence or an absence of a region, wherein the region is a region in which the traffic participant is able to enter the roadway from the sidewalk that is in front of the participant,
  recognizing a type of structure of a boundary between the sidewalk and roadway, in a case where there is the region,
  recognizing a presence or an absence of another traffic participant in front of the traffic participant, in a case where the traffic participant is moving on the sidewalk, wherein the another traffic participant interfering with a moving of the traffic participant,
  determining whether the traffic participant's face, head, or body is directed toward the roadway side or not, and
  determining whether a central axis of the traffic participant tilt toward the roadway side or not,
deriving a plurality of scores according with each of result of recognizing and determining, and integrating the derived scores, and
setting the risk index for the position at which the traffic participant will be present in the future based on the derived scores.

19. A vehicle control device comprising:
a recognizer configured to recognize a vicinity of a vehicle;
a setter configured to set a risk index for a traffic participant recognized by the recognizer; and
a controller configured to control a vehicle-mounted instrument of the vehicle based on the risk index which is set by the setter,
wherein the setter sets the risk index for a position at which the traffic participant will be present in the future based on ease of entry of the traffic participant from a sidewalk to a roadway adjacent to the sidewalk in a region that the traffic participant traveling on the sidewalk will enter in the future, and increases the risk index to be set on the roadway side as there is a greater tendency for the traffic participant to enter the roadway,
wherein, in a case where the traffic participant and an another traffic participant are on the sidewalk and the another traffic participant is in front of the traffic participant, and at least the risk index is less than a threshold, the setter sets a first specific region corresponding to the risk index around a first position corresponding to the traffic participant,
in a case where the traffic participant and an another traffic participant are on the sidewalk and the another traffic participant is in front of the traffic participant, and at least the risk index is equal or greater than a threshold, the setter sets a second specific region corresponding to the risk index around a second position corresponding to the traffic participant,
the second specific region is larger than the first region, the second position is in which altering the first position to an opposite direction of a road side, and
the first position and the second position are set between:
  a position of the traffic participant, and
  the another traffic participant in a longitudinal direction of the sidewalk or a travelling direction of the traffic participant.

20. A non-transitory computer readable storage medium that stores a program to be executed by a computer to at least:
recognize a vicinity of a vehicle;
set a risk index for a recognized traffic participant;
control a vehicle-mounted instrument of the vehicle based on the risk index; and
set the risk index for a position at which the traffic participant will be present in the future based on ease of entry of the traffic participant from a sidewalk to a roadway adjacent to the sidewalk in a region that the traffic participant traveling on the sidewalk will enter in the future, and increase the risk index to be set on the roadway side as there is a greater tendency for the traffic participant to enter the roadway,
wherein, in a case where the traffic participant and an another traffic participant are on the sidewalk and the another traffic participant is in front of the traffic participant, and at least the risk index is less than a threshold, set a first specific region corresponding to the risk index around a first position corresponding to the traffic participant,
in a case where the traffic participant and an another traffic participant are on the sidewalk and the another traffic participant is in front of the traffic participant, and at least the risk index is equal or greater than a threshold, set a second specific region corresponding to the risk index around a second position corresponding to the traffic participant,
the second specific region is larger than the first region, the second position is in which altering the first position to an opposite direction of a road side, and
the first position and the second position are set between:
  a position of the traffic participant, and
  the another traffic participant in a longitudinal direction of the sidewalk or a travelling direction of the traffic participant.

* * * * *